United States Patent
Sapire

(10) Patent No.: US 10,617,260 B2
(45) Date of Patent: *Apr. 14, 2020

(54) BLENDER

(71) Applicant: CAPBRAN HOLDINGS, LLC, Los Angeles, CA (US)

(72) Inventor: Colin Sapire, Los Angeles, CA (US)

(73) Assignee: Capbran Holdings, LLC, Los Angeles, CA (US)

(*) Notice: Subject to any disclaimer, the term of this patent is extended or adjusted under 35 U.S.C. 154(b) by 77 days.

This patent is subject to a terminal disclaimer.

(21) Appl. No.: 15/838,217

(22) Filed: Jan. 11, 2018

(65) Prior Publication Data

US 2018/0110370 A1  Apr. 26, 2018

Related U.S. Application Data

(63) Continuation of application No. 14/507,180, filed on Oct. 6, 2014, now Pat. No. 9,839,326.

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0716* (2013.01); *A47J 43/0766* (2013.01); *A47J 43/0772* (2013.01)

(58) Field of Classification Search
CPC .. A47J 43/046; A47J 43/0716; A47J 43/0766; A47J 43/0772

USPC ................ 366/205, 206, 314, 601; 241/37.5, 241/199.12, 282.1, 282.2

See application file for complete search history.

(56) References Cited

U.S. PATENT DOCUMENTS

| | | | | |
|---|---|---|---|---|
| 4,371,118 A | * | 2/1983 | Sontheimer | A47J 43/046 241/282.2 |
| 4,487,509 A | * | 12/1984 | Boyce | A47J 43/046 366/199 |
| 4,629,131 A | * | 12/1986 | Podell | A47J 43/046 241/199.12 |
| 4,723,719 A | * | 2/1988 | Williams | A47J 43/044 241/282.2 |
| 4,741,482 A | * | 5/1988 | Coggiola | A47J 43/046 241/282.1 |
| 5,779,358 A | * | 7/1998 | Bevington | A47J 43/0766 241/37.5 |
| 5,852,968 A | * | 12/1998 | Sundquist | A47J 43/06 241/282.1 |
| 5,882,113 A | * | 3/1999 | Binder | B01F 13/0016 366/146 |
| 6,283,625 B2 | * | 9/2001 | Frankel | A47J 43/0716 366/146 |

(Continued)

*Primary Examiner* — Anshu Bhatia
(74) *Attorney, Agent, or Firm* — Trojan Law Offices

(57) ABSTRACT

A food-processing device for blending and mixing food comprises a mixing vessel, a blade holder, and a motor base. The motor is a high power motor. The device has various safety features designed for the high power motor. The blade holder comprises a safety mechanism that prevents the motor base from operating without the mixing vessel covering the blade. The mixing vessel also contains emitters that interact with detectors on the motor base that can allow a user to select an alternate blend speed according to the mixing vessel that is attached.

11 Claims, 24 Drawing Sheets

(56) References Cited

U.S. PATENT DOCUMENTS

| | | | | |
|---|---|---|---|---|
| 6,402,365 | B1* | 6/2002 | Wong | A47J 43/046 241/36 |
| 6,513,967 | B2* | 2/2003 | Masip | A47J 43/046 241/37.5 |
| 6,609,821 | B2* | 8/2003 | Wulf | A47J 43/042 318/256 |
| 6,629,492 | B1* | 10/2003 | Li | A47J 43/046 241/37.5 |
| 6,632,013 | B2* | 10/2003 | Wulf | A47J 43/0727 366/199 |
| 6,655,265 | B2* | 12/2003 | Pavlovic | A47J 43/0772 241/37.5 |
| 6,805,312 | B2* | 10/2004 | Capp | A47J 27/004 241/199.12 |
| 6,854,875 | B2* | 2/2005 | McGill | A47J 36/022 366/199 |
| 6,962,432 | B2* | 11/2005 | Hofeldt | A47J 43/042 215/309 |
| 7,018,091 | B2* | 3/2006 | Arroubi | A47J 43/0716 241/37.5 |
| 7,047,872 | B2* | 5/2006 | Mulle | A47J 43/0788 241/37.5 |
| 7,063,009 | B2* | 6/2006 | Lin | A47J 43/0766 366/314 |
| 7,780,337 | B2* | 8/2010 | Peng | A47J 27/004 366/144 |
| 7,817,006 | B2* | 10/2010 | Fullerton | F41G 11/001 335/285 |
| 7,841,764 | B2* | 11/2010 | Wulf | A47J 43/042 318/452 |
| 7,938,574 | B2* | 5/2011 | McGill | A47J 43/0761 366/199 |
| 7,993,054 | B2* | 8/2011 | Wulf | A47J 43/042 366/205 |
| 8,042,990 | B2* | 10/2011 | Pryor, Jr. | A47J 43/0766 366/197 |
| 8,529,118 | B2* | 9/2013 | Davis | A47J 43/042 366/205 |
| 9,839,326 | B2* | 12/2017 | Sapire | A47J 43/0766 |
| 2004/0042337 | A1* | 3/2004 | Yiu | A47J 43/046 366/199 |
| 2004/0100862 | A1* | 5/2004 | Arroubi | A47J 43/0716 366/206 |
| 2006/0198241 | A1* | 9/2006 | Krishnachaitanya | A47J 43/046 366/205 |
| 2008/0198688 | A1* | 8/2008 | Peng | A47J 27/004 366/145 |
| 2009/0084274 | A1* | 4/2009 | Kovacic | A47J 43/0766 99/492 |
| 2011/0013478 | A1* | 1/2011 | Athey | A47J 43/0766 366/205 |
| 2011/0248108 | A1* | 10/2011 | Carriere | A47J 43/0722 241/33 |
| 2012/0325948 | A1* | 12/2012 | Garcia | A47J 36/10 241/101.1 |
| 2013/0192477 | A1* | 8/2013 | Hoare | A47J 36/32 99/486 |
| 2014/0247686 | A1* | 9/2014 | Arnett | A47J 43/046 366/205 |

* cited by examiner

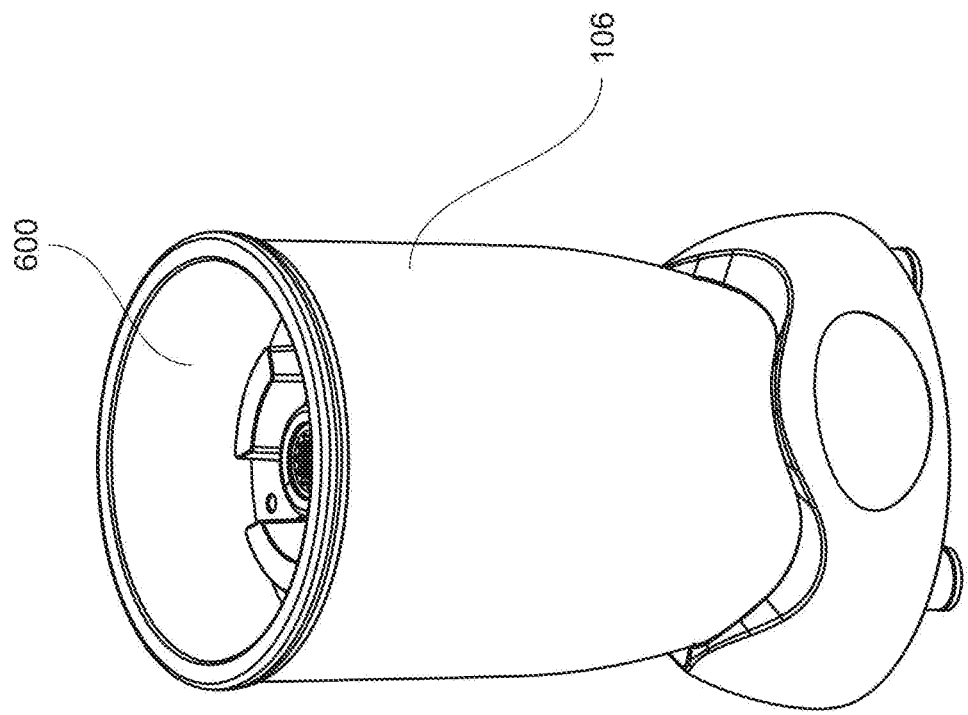
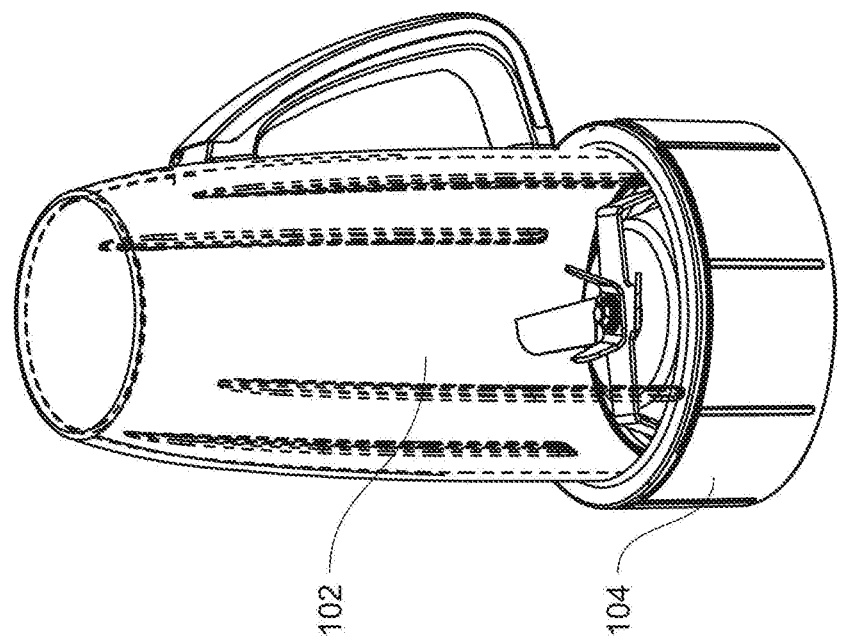
Fig. 2

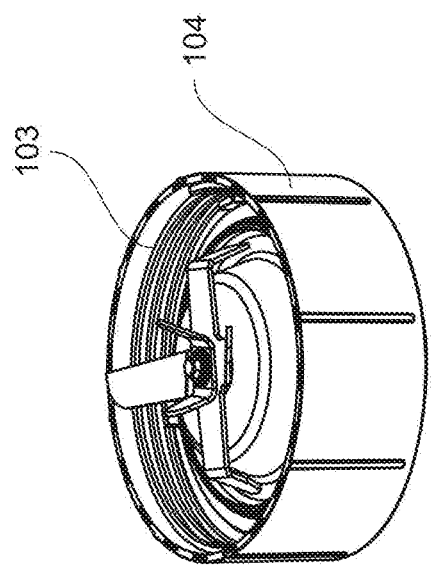
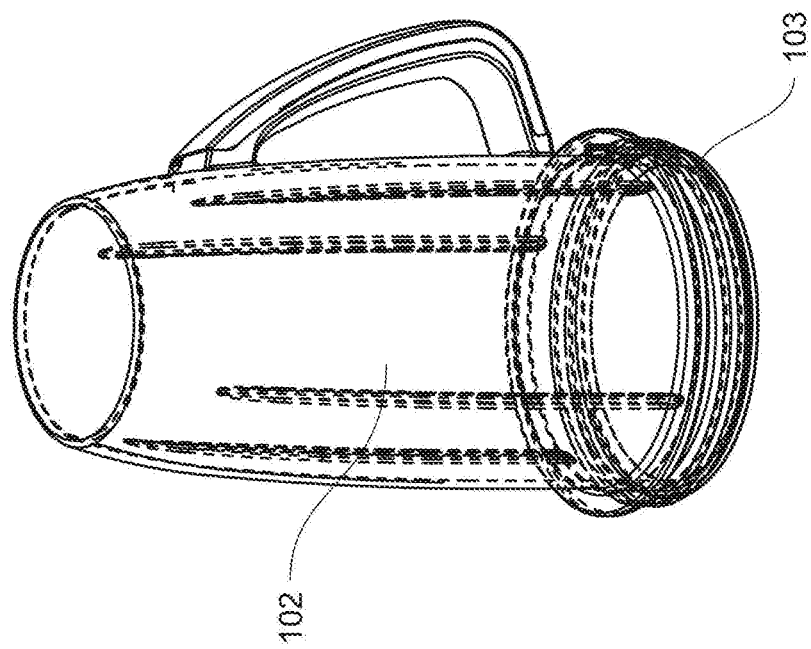
Fig. 3

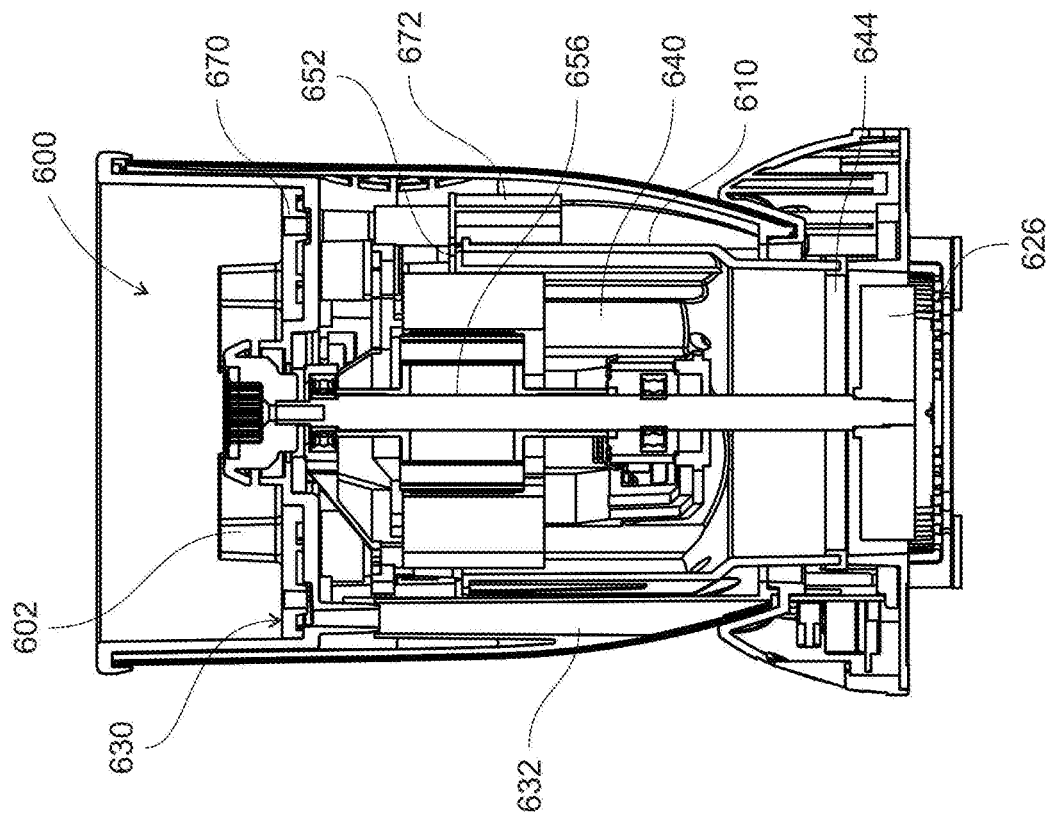
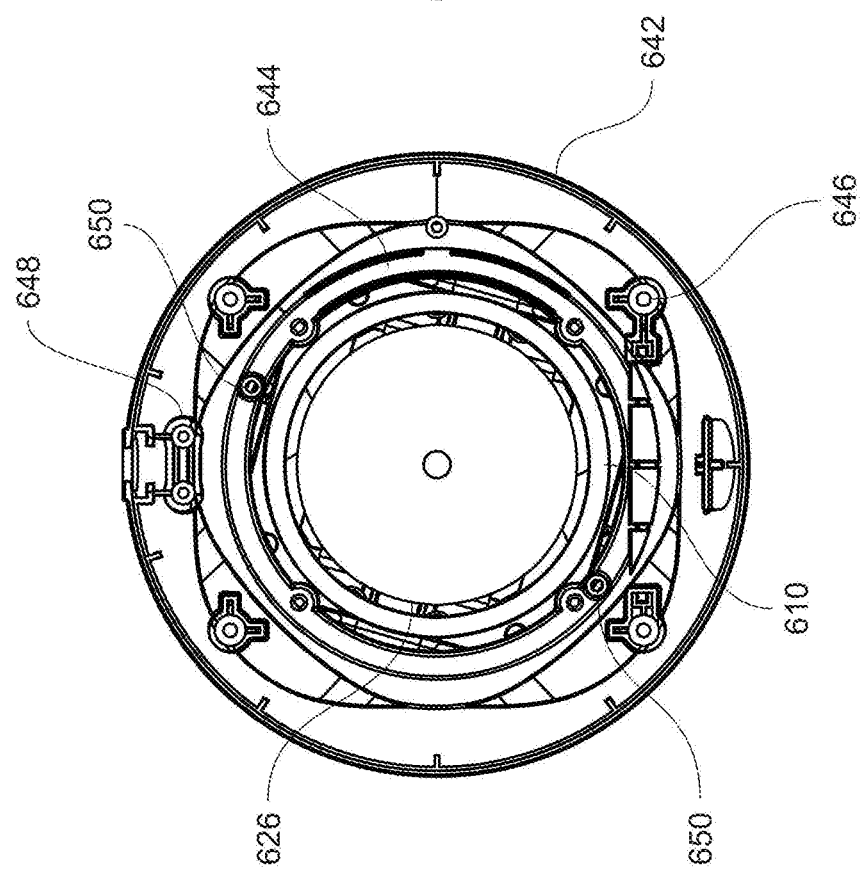
Fig. 14
Fig. 13

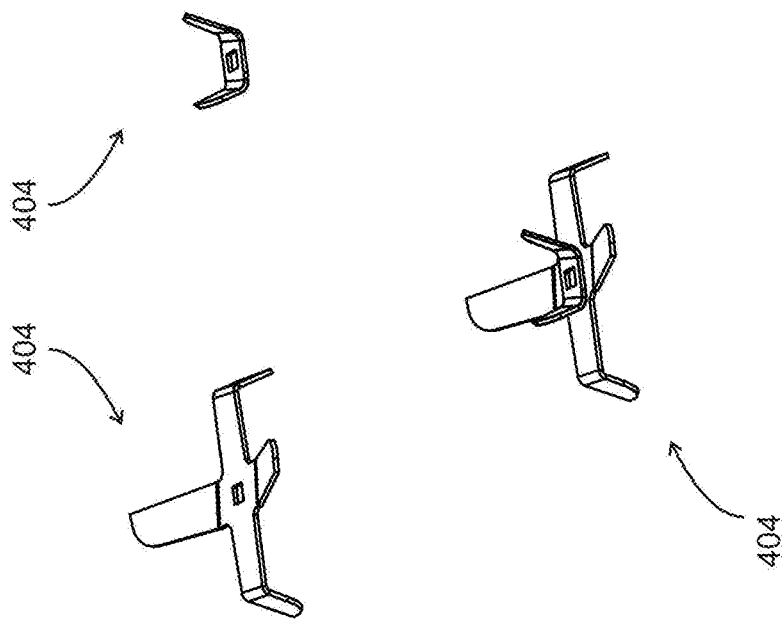
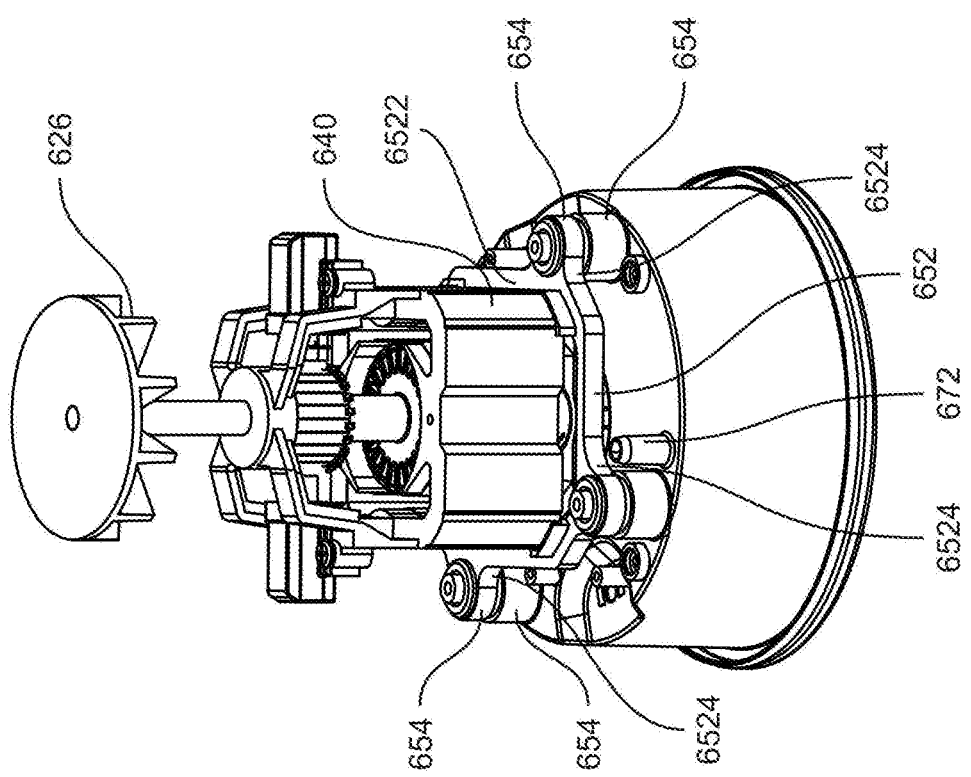

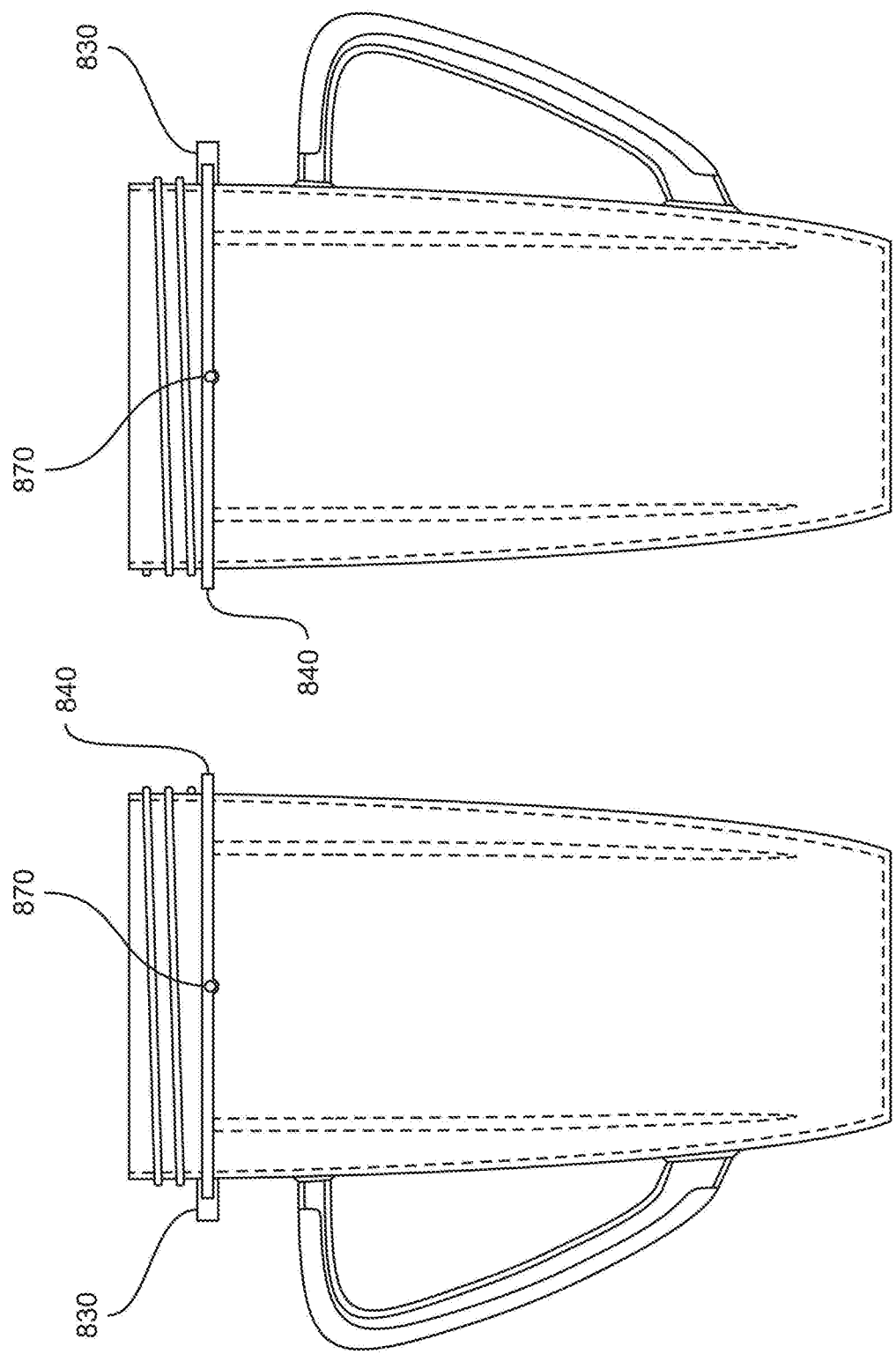

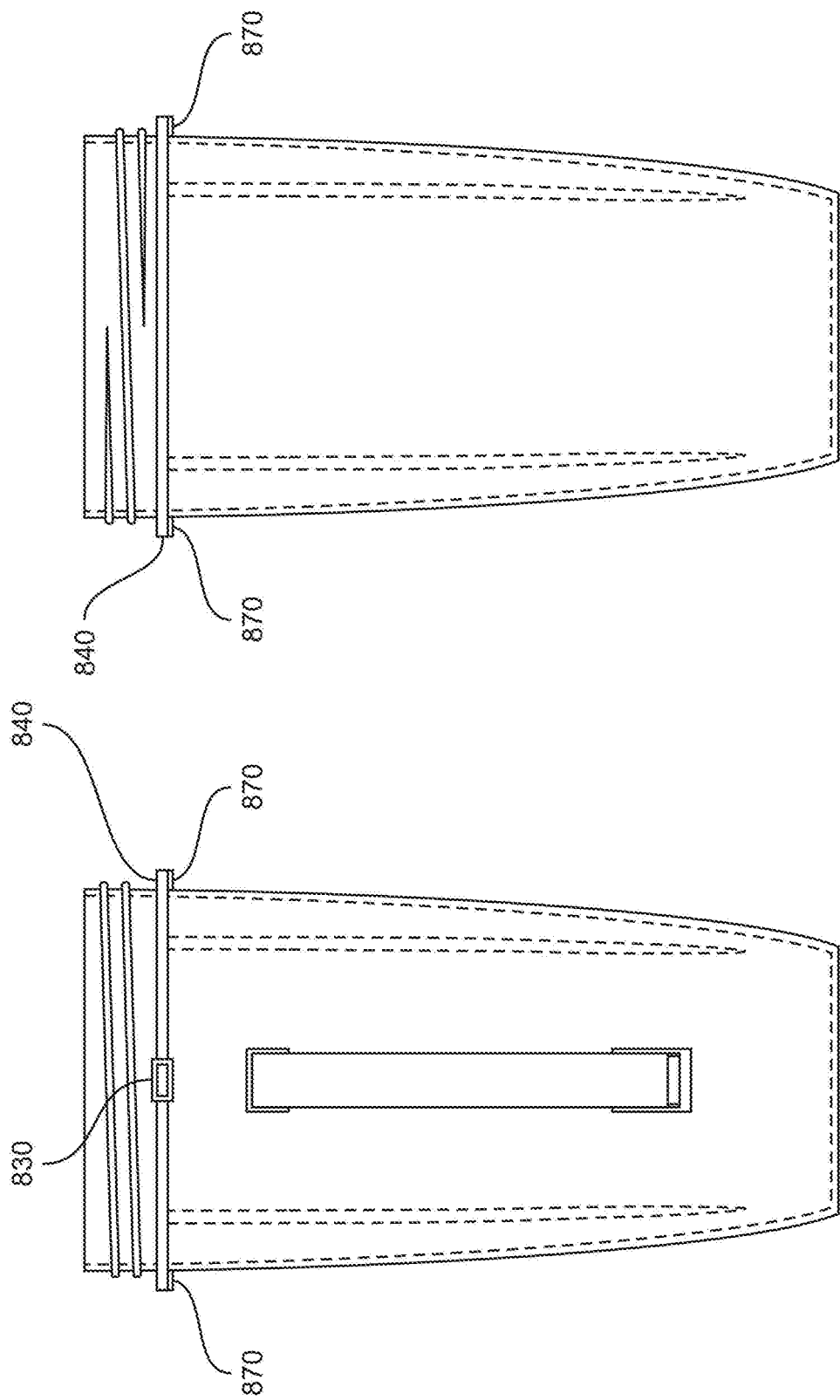

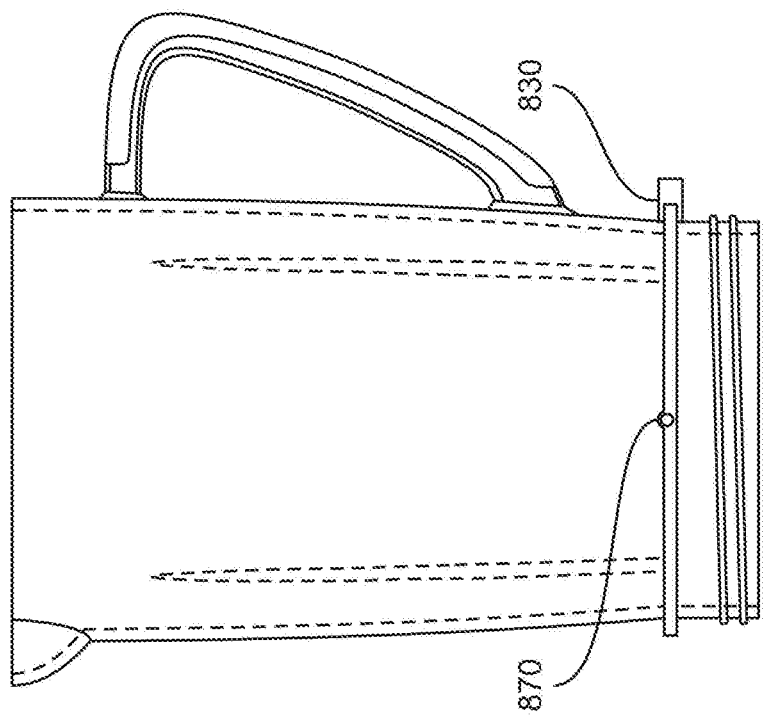
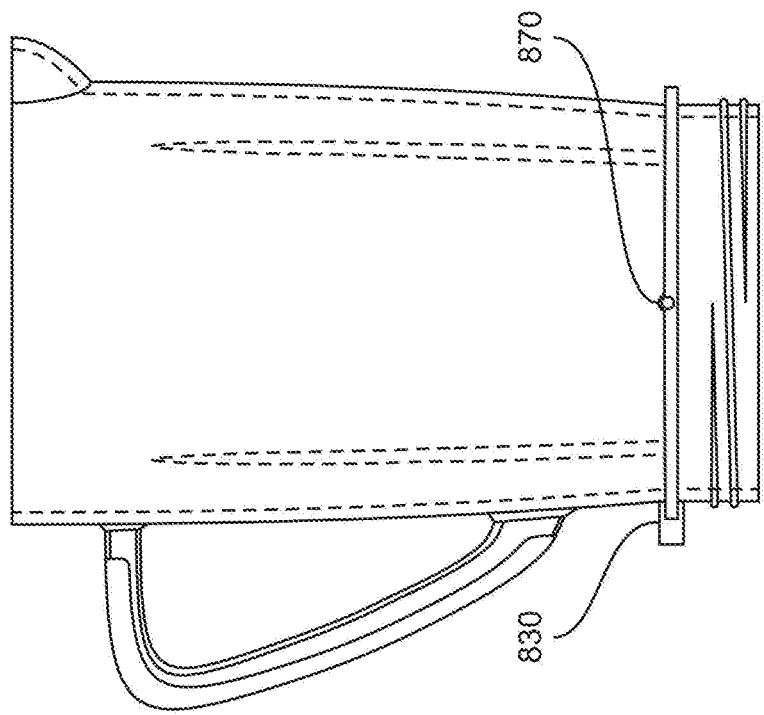

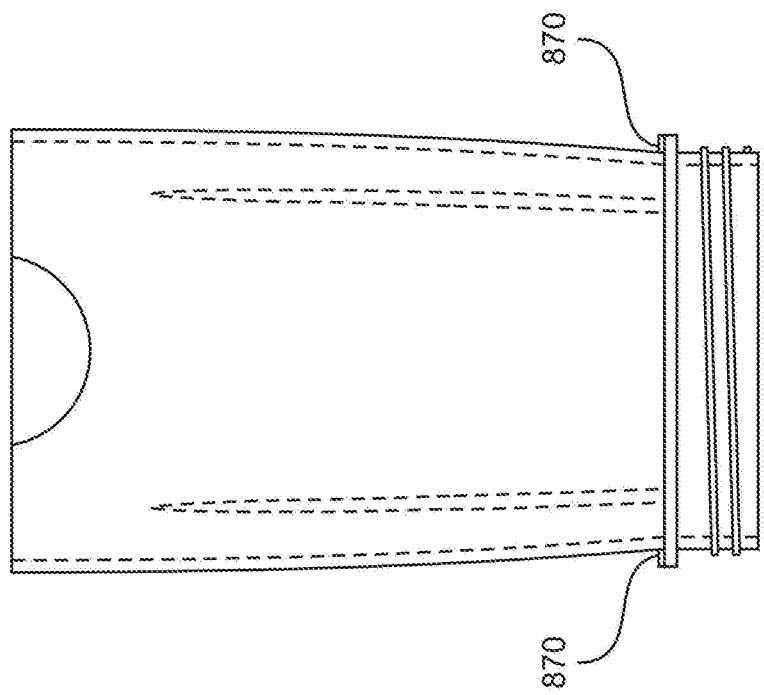
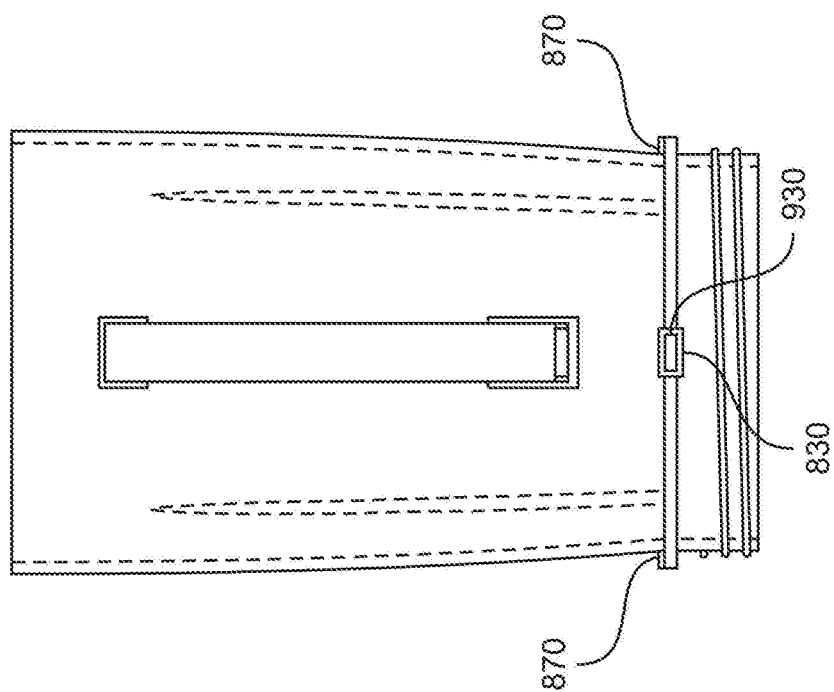

BLENDER

CROSS REFERENCE TO RELATED APPLICATION

This application is a continuation of Ser. No. 14/507,180, filed on Oct. 6, 2014.

FIELD OF THE INVENTION

The present invention relates to household and kitchen appliances. In particular, the present invention relates to blenders and food processors. Even more particularly, the present invention relates to high performance blenders with various safety features and alternate blending speeds.

BACKGROUND

Traditionally, blenders are mainly used for blending liquid or relatively soft solid such as fruits and vegetables. Over the years, different receipts with more solid food, such as meats and ice, for blenders have been developed. These solid or dry foods are significantly more difficult to break and mix together. Therefore, there are increasing demands for high performance blenders with more rigid blades that are capable of mixing and blending different kinds of food. To break different kinds of solid foods, a strong and powerful motor must be used to drive the blades of the blender. Yet, various problems associated with a high power motor limit the design and the functionality of blenders.

One obvious problem associated with a powerful motor is the significant increase in size and weight of the blender. Since the weight of the blender increases with the size of the motor and the size of the blender also increases with the size the housing that holds the motor, the use of a large motor makes the blender less desirable for many consumers due to the size and the weight. To limit the size, the motor will have to be confined in a smaller housing. Yet, this reduces the ventilation of the housing, causing potential overheating the motor.

Overheating of the motor poses different safety and durability concerns to a blender. The overheating of a powerful motor confined in small housing could damage the components of the motor. The heat could melt the plastic and the electrical wires inside or nearby the motor housing, causing to emit hazardous and highly unpleasant smell. The melting or even burning of the electrical wires could also significantly increase the chance of electricity leakage and even cause the burning of the blender. The heat from the motor could also be transferred to the outer housing or the shell of the blender. This could melt the external design of the blender and potentially burn and injure the user.

Another type of overheating associated with a powerful motor is the overheating of the blade assembly. The blades in a blender rotate in a significantly higher speed when it is driven by a powerful motor. The friction associated with the high-speed rotation often generates a large amount of heat. When liquid or semi-liquid foods are put in the blender, the heat of the blades can usually quickly disperse over the foods. However, when solid and dry foods are being processed, heat accumulates around the moving part of the blade assembly and transfer to other parts of the blender. The heat could melt the plastic parts of the blender, releasing hazardous gas and endangering the health of the users. Any damage to the blade assembly could also affect the rotational speed of the blades, cause the blade to vibrate irregularly and vigorously, and even change the blade's rotation path. This affects the efficiency of the blender and sometimes renders the blender inoperable.

Another problem associated with a powerful motor is the vibration of motor and the blender. For a small motor, such as a 200-watt motor, the vibration is usually hardly noticeable. However, when a more powerful motor is used, the vibration increases significantly. Not only does the vibration cause unpleasant sound and unwanted movement of the blender, but it also creates other safety and design issues. In general, a blender with notable vibration is undesirable and perceived as unreliable by the customers. Unmanageable vibration could cause the blender to topple and fall. Vibration could also affect the normal horizontal rotation of the blades and reduce the efficiency of the blender.

Blenders with powerful motors are subject to heavy usage. They are often used for crushing ice and breaking rigid and dry foods. The blades become an expensive part of the blender because it must be durable and have the quality required for crushing and breaking hard objects. The blades must also be sharp and rigid for their usage. This raises safety concerns to the blender with powerful motors since the blades could severely injure the users if the users accidentally contact the blades. Even if a blender is properly designed, it could still pose a threat to the users, especially children, because of improper installation or unintended use. This safety concern is of particular importance for high performance blender because of its enhanced ability in cutting through more solid objects.

Blenders with powerful motors are usually relatively large in size. Its blade holder and the mixing vessel are also larger than those in regular blenders. Owing to their size, it can be difficult for users to attach the mixing vessel to the blade holder because the users may not be able to firmly grip the large mixing vessel with one hand. One common difficulty is not being able to screw the blade holder from the mixing vessel to a satisfactory tightness. If the blade holder is not screwed on tight enough, liquid may seep out of the mixing vessel through the blade holder into the motor unit of the blender. However, if the blade holder is screwed onto the mixing vessel too tightly, after the blending is done, it may be difficult to unscrew the blade holder from the mixing vessel. In particular, after each blending, the mixing vessel contains the blended food or liquid. Users would normally be hesitant to forcefully turn the blade holder due to the concern that the content in the mixing vessel may splash at the moment the blade holder starts unscrewing from the mixing vessel. The blending of the liquid content in the mixing vessel could also cause some of the liquid to go into the junction of the mixing vessel and the blade holder, sealing the mixing vessel and causing the blade holder even more difficult to unscrew. Moreover, the exterior of the mixing vessel is often wet and slippery. Thus, screwing and unscrewing the blade holder and the mixing vessel could be extremely difficult, especially for high power blenders with large mixing vessels.

Blenders with powerful motors are difficult to build and it is extremely challenging to address all safety and design problems associated with a large motor. Accordingly, a long-felt need remains for a high performance blender system that is safe, convenient to use and easy to clean.

SUMMARY

The embodiments of the present invention relate to a food processing device preferably with a high power motor. The food processing could be a blender or other similar devices.

Some embodiments comprises a mixing vessel. The mixing vessel has a wall that defines an opening that can be connected to a blade holder. The blade holder has a top surface and a bottom surface. It is capable of removably attached to the mixing vessel by some mechanism such as a screw means.

In some embodiments, the top surface of the blade holder has a blade rotatably mounted on the blade holder and a pin mechanism with a movable pin. The bottom surface has a couple gear and a recess with a particular shape. The pin mechanism is also visible from the bottom surface of the blade holder. The pin mechanism is located at a first particular location on the bottom surface. The pin mechanism operates across the top surface and the bottom surface. The pin is capable of protruding from the top surface or from the bottom surface, depending on whether it is being depressed. When the pin is not depressed, its natural position is being protruding from the top. When it is depressed, it moves from the top surface to the bottom surface and becomes protruding from the bottom.

In some embodiments, the coupling gear and the blade are connected through an axis. The axis is surrounded by a plurality of ball bearings, which are confined by a sleeve. The ball bearings reduce the friction and heat generated by the high-speed rotation of the blade and the coupling gear.

In some embodiments, the food processor also has a motor base having a bottom cover removably attached, a skirt removably attached, a motor housing with a motor located therein, and a well located on top of the motor housing. The well is capable of allowing the blade holder to be inserted therein.

The motor housing has a ceiling and a bottom entrance. In some embodiments, the motor is mounted only on the ceiling of the motor housing but not other locations. It is mounted on the ceiling indirectly through a motor bracket. The motor bracket is mounted on the ceiling through a plurality of dampers. The dampers being located between the ceiling and the motor bracket and located underneath the motor bracket. The bottom entrance of the motor housing is smaller than the motor to prevent the motor from falling outside of the motor housing. The motor is connected to a fan at its bottom end and is also connected to an electrical circuit that controls the motor. The fan is located outside the motor housing and below the bottom entrance.

In some embodiments, the motor has a high power, preferably over 950 watts. In an embodiment, the motor is a 1200 watt motor.

The well of the motor base has a well surface with a raised area, an impeller, an actuator, and a drainage hole on the surface. The raised area complementarily matches the particular shape of the recess on the bottom surface of the blade holder. The impeller is connected to the motor such that it is being driven by the motor. The actuator is connected to the circuit and is located at a second particular location on the surface of the well. When the actuator is pressed, the actuator closes the circuit. The drainage hole is connected to a third location below the motor housing through a tunnel.

When the mixing vessel is connected to the blade holder, the wall of the mixing vessel causes the pin to protrude from the bottom surface. The matching in shape of the recess and the raised area aligns the blade holder and the motor base when the blade holder is inserted into the well of the motor base. The position of the actuator and the pin mechanism also matches when the blade holder and the motor base align. This causes the protruding pin to depress the actuator. The food processor is capable of automatically being turned on when the blade holder connected to the mixing vessel is inserted into the well of the motor base.

The bottom cover of the motor base comprises a plate and a cup shaped housing. The plate has a plurality of openings thereon. The cup shaped housing is partially located inside the motor housing when the bottom cover is attached to the motor base, and housing substantially isolates the motor housing from the third location, preventing liquid from the drainage hole from entering the motor housing. The skirt of the motor base is located in between the motor housing and the bottom cover. The skirt is removably attached to the plate of the bottom cover and to the motor housing. It is larger than the entrance to provide mechanical support to the motor base.

In some embodiments, the circuit has a soft start function and a timer that automatically turns off the motor after the motor has been operating for a predetermined amount of time. The circuit being connected to a switch mounted on the motor base. The switch has three different status positions—a released position, a first depressed position and a second depressed position. The released position opens the circuit while both the first depressed position and the second depressed position close the circuit, wherein the first depressed position automatically returns to the released position once the switch is no longer depressed, but the second depressed position stays the circuit closed when the switch is no longer depressed.

Some embodiments of the present invention also relate to system for unscrewing a mixing vessel from a blade holder. It is an object of the present invention to provide a tool for use with a mixing vessel and blade holder to unscrew from mixing vessel from the blade holder. The tool is a wrench that has an elongated handle and a socket complementarily shaped to the bottom surface of the blade holder, such that when the socket is placed on the bottom surface of the blade holder, the socket engages the blade holder. When the handle of the wrench is rotated, a torque is applied to the blade holder, thus enabling the user to unscrew the blade holder from the mixing vessel when rotated in one direction (e.g. clockwise), and tighten the mixing vessel to the blade holder when rotated in the opposite direction (e.g. counter-clockwise). Features of the mixing vessel that also aid in unscrewing the blade holder from the mixing vessel include one or more protrusions on the outer surface of the mixing vessel that allow the user to more easily grip the mixing vessel while applying torque to the blade holder via the wrench handle.

In one aspect, the system for opening a mixing vessel has a wrench, a blade holder and a mixing vessel. The wrench has an elongated member having a first end portion and an opposing second end portion. Attached to the opposing second end portion is a head region that has a bottom surface and a top surface. The bottom surface of the head region has a recessed socket.

The blade holder has a top surface, a bottom surface, and an inner threaded surface. The bottom surface has at least one protruding member complementarily shaped to a recessed region of the socket on the wrench, which permits the socket to engage with the bottom surface of the blade holder. A mixing blade is attached to the blade holder via a blade attachment member that runs substantially through the central vertical axis of the blade holder. This blade attachment member secures the blade to the blade holder.

The mixing vessel has a closed top region, an open top when unscrewed from the blade holder, and an outer surface. The outer surface of the mixing vessel has an lower threaded portion adapted to engage the blade holder inner surface.

The outer surface of the mixing vessel also has at least one gripping member protruding from the mixing vessel outer surface. The user can screw on the blade holder to the mixing vessel by hand or by using the wrench clockwise (or counterclockwise, should the threading of the mixing vessel and blade holder be reversed from a traditional configuration). To disengage the blade holder from the mixing vessel, the user places the socket over the bottom surface of the blade holder. A horizontal rotation of the wrench rotates the blade holder due to complimentary shape of socket and the bottom of the blade holder, which prevents mere spinning of the wrench without also rotating the blade holder. To aid in disengaging the mixing vessel from the blade holder, the user grips the gripping members of the mixing vessel while rotating the wrench to unscrew the blade holder from mixing vessel.

In other embodiments of the invention the gripping member on the outer surface of the mixing vessel is a plurality of ribs extending substantially form the top of the mixing vessel to the bottom of the mixing vessel.

In other embodiments of the invention, the plurality of gripping members are four ribs substantially equally spaced, running lengthwise from the top of the mixing vessel to the bottom of the mixing vessel.

In yet other embodiments of the invention, the gripping member is a handle on the outer surface of the mixing vessel. The socket on the wrench is characterized as having a central recessed region having an outer periphery, and a plurality of recessed grooves extending radially outward from the outer periphery of the central recessed region, and the protruding member on the blade holder bottom surface is a protruding circular region complementarily shaped to the recessed inner circular region of the socket. The central recessed region and plurality of grooves in the socket are adapted to engage the at least one protruding member on the bottom surface of the blade holder.

In some embodiments of the invention the protruding member on the bottom surface of the blade holder further comprises a plurality of protruding members extending radially form a periphery of the protruding circular region on the blade holder.

The wrench, blade holder, and mixing vessel have several advantages over the prior art. Since the socket is complimentarily shaped to the bottom surface of the blade holder, the wrench can easily be placed over the blade holder and easily removed from the blade holder. While easily removable, by having the complimentary shaped structures, the wrench and blade holder do not slip off each other when the wrench is rotated either clockwise (to loosen), or counterclockwise (to tighten) the blade holder and the mixing vessel. After the blade holder and mixing vessel are either tightened or loosed to the user's preference, the wrench is simple lifted off bottom surface of the blade holder. In this way, the user can tighten the mixing vessel and blade holder enough so that the contents of the mixing vessel will not leak out without having to worry about over tightening the mixing vessel, which would later make it difficult to remove the mixing vessel from the blade holder.

BRIEF DESCRIPTION OF THE DRAWINGS

FIG. 2 is a perspective view of a mixing vessel with a blade holder separated from a base of a blender in accordance with an embodiment of the present invention.

FIG. 3 is a perspective view of a mixing vessel separated from a blade holder in accordance with an embodiment of the present invention.

FIG. 13 is an bottom view of a motor housing in accordance with an embodiment of the present invention, viewing from the bottom and showing the entrance of the motor housing.

FIG. 14 is an illustrative view of the internal structure of a motor housing of a motor base in accordance with an embodiment of the present invention.

FIG. 15 is an inverted isolated view of a motor attached to ceiling of a motor housing of a motor base in accordance with an embodiment of the present invention.

FIG. 16 is isolated views of a blade in accordance with some embodiments of the present invention.

FIG. 19-FIG. 20 are side views of a mixing vessel with one open end separated from the blade holder in accordance with an embodiment of the present invention.

FIG. 21 is a font view of a mixing vessel with one open end separated from the blade holder in accordance with an embodiment of the present invention.

FIG. 22 is a back view of a mixing vessel with one open end separated from the blade holder in accordance with an embodiment of the present invention.

FIG. 25-FIG. 26 are side views of a mixing vessel with two open ends separated from the blade holder in accordance with an embodiment of the present invention.

FIG. 27 is a font view of a mixing vessel with two open ends separated from the blade holder in accordance with an embodiment of the present invention.

FIG. 28 is a back view of a mixing vessel with two open ends separated from the blade holder in accordance with an embodiment of the present invention.

DETAILED DESCRIPTION OF EMBODIMENTS

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

Figure 1:
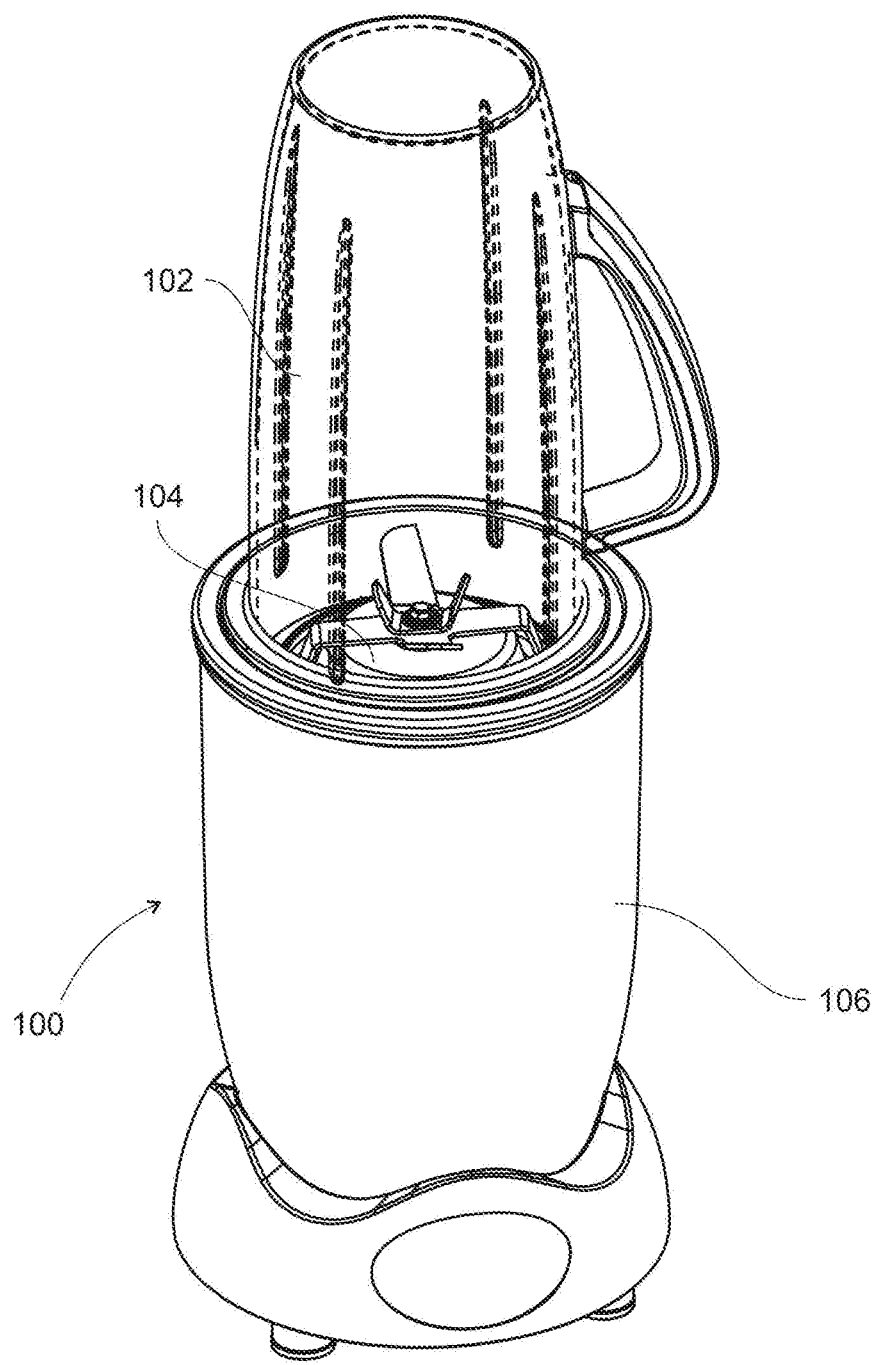
FIG. 1 is a perspective view of a blender in accordance with an embodiment of the present invention.

Turning to the drawings, FIG. 1 is directed to a perspective view of a blender 100 in accordance with some embodiments of the present invention. The blender 100 mainly comprises of three parts—a mixing vessel 102, a blade holder 104, and a motor base 106. In some preferred embodiments of the present invention, the blender 100 resembles a bullet shape with special wave-shaped design at the bottom part of the blender 100. Yet, as those skilled in the art will appreciate, the blender 100 may have a plurality of shapes known or developed in the art. The mixing vessel 102 and the blade holder 104 together form a closed container for the mixing and blending of food and liquid. The mixing vessel 102 removably attaches to the blade holder 104. The mixing vessel 102 with the blade holder 104 is removably attached to the motor base 106. As shown in FIG. 2, the closed container 102 can be removed from the motor base 106 while the mixing vessel 102 and the blade holder 104 are attached to each other. When the mixing vessel 102 and the blade holder 104 are removed from the motor base 106, it reveals a well 600 on the motor base 106. The well 600 is the chamber for the blade holder 104 to be inserted. Although the blade holder 104 without attaching to the mixing vessel 102 can still be inserted into the well 600 of the motor base 106, it will be described in greater detail below that the blender 100 cannot be operated unless the blade holder 104 is attached to the mixing vessel 102 when it is inserted into the well 600.

Turning to FIG. 3, a perspective view of a mixing vessel 102 separated from a blade holder 104. In some embodiment, the mixing vessel 102 removably attaches to the blade holder 104 by a screw-fit relation 103. Those skilled in the art will appreciate that the mixing vessel 102 may engage with the blade holder 104 by other means known or developed in the art, such as a series of cap-locking members, ridges or a push-and-turn mechanism. In the particular embodiment shown in FIG. 3, the blade holder 104 can be considered as the lid of the mixing vessel 102 when the mixing vessel 102 is inverted. When food has been blended and processed by the blender 100, the user can take the mixing vessel 102 out from the motor base 106, invert the mixing vessel 102, and open the blade holder 104 to pour the food out of the mixing vessel 102. Depending on the size of the mixing vessel 102, the mixing vessel 102 may be used directly as a drinking vessel for the convenience of the users. Alternatively, after the food has been processed, the blade holder 104 can be replaced by a regular lid that can removably attach to the mixing vessel 102 by the same screw-fit relation 103. The mixing vessel 102 can then act as a container for storage. Unlike the design of other blenders' mixing vessels, which often requires the user to pour the food into another container for storage, the mixing vessel 102 in some embodiments of the present invention is more convenient for the users to store the blended contents.

Figure 4:
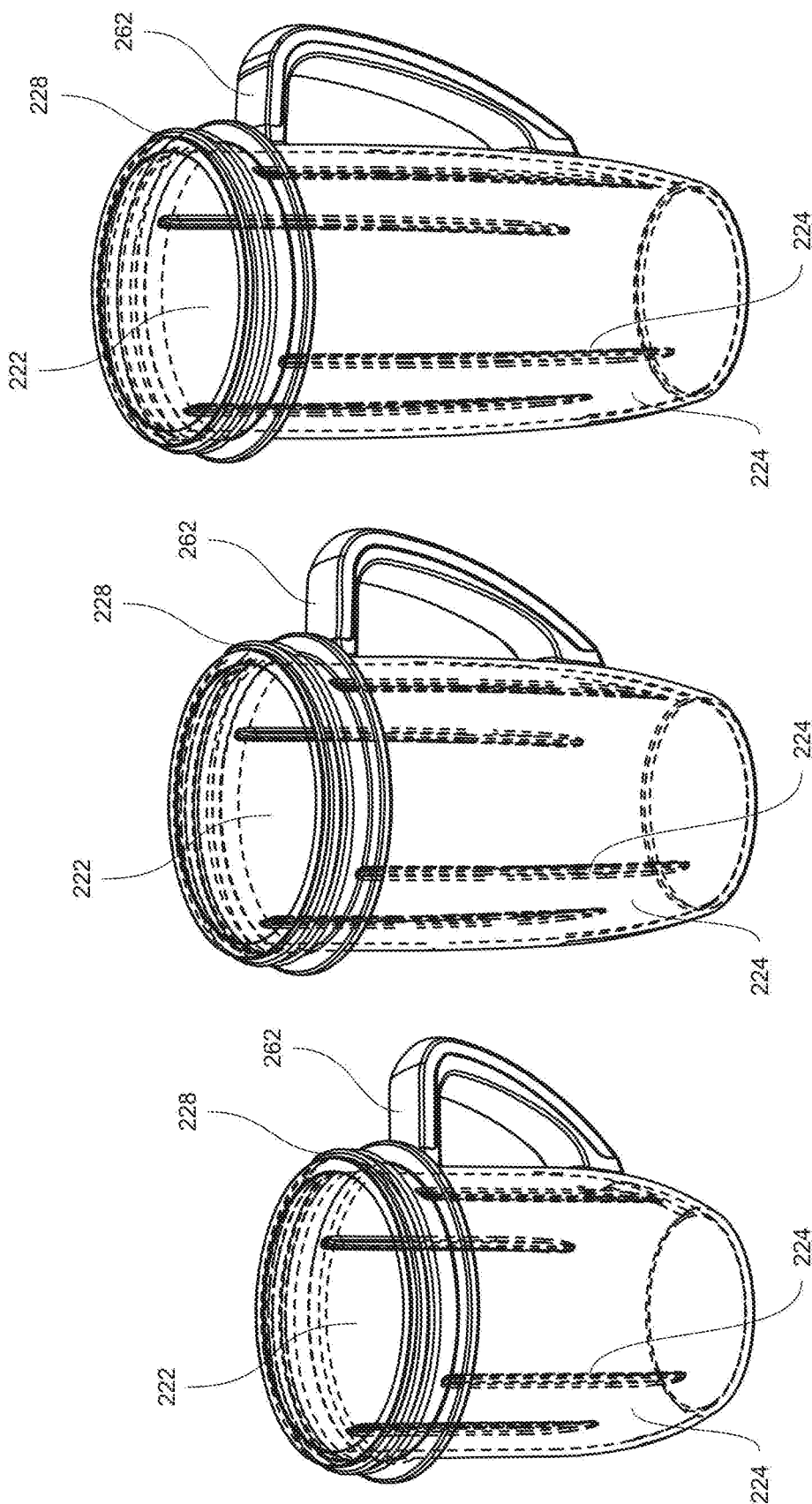
FIG. 4 is a perspective view of different mixing vessels in accordance with different embodiments of the present invention.

FIG. 4 shows different individualized mixing vessels 102 in accordance with different embodiments of the present invention. The mixing vessels 102 can be in different shape and size to suit different needs. The first mixing vessel 202 has an opening 220 at the top and an opening 222 at the bottom. Along the edge of the opening 222 is a connection mechanism such as a threaded region 228, adapted to engage with the inner threaded surface 422 of the blade holder 104. On both the external wall and the internal wall of the first vessel 102, multiple elongated ridges 224 are present. The ridges 224 may be spaced equally from each other. The ridges 224 on the internal wall of the first vessel 102 facilitate the blending of the foods in the vessel 202. The position of the internal ridges 224 are preferably near the opening that is connected to blade holder 104 because most of the blending of the foods occurs near the blade holder 104. The ridges 224 on the external help the users to grip the vessel 202 more firmly by providing anti-slippery effect. The ridges 224 are rib-like structures that extend substantially vertically from the top to the bottom of the mixing vessel 102. Another version of the vessel 202 is also shown here, except it has only one opening 224. The opening 222 is for the connection of the blade holder 104.

Similar to the first mixing vessel 202, the second mixing vessel 204 also has ridges 224 on its external and internal walls. The second vessel 204 has only one opening 222, which contains screw threads 228 for the blade holder 104 to engage with the second vessel 204. The second vessel 204 shows a dome shape. The second vessel 204 is resting on external ridges 224. The external ridges 224 are shaped so as to permit the second vessel 204 to rest on the apex of the dome shaped vessel 204 without tipping over. As those skilled in the art will appreciate, the number of ridges 224 may be varied so long as the vessel 204 can stand upright.

The third vessel 206 shown is similar to the second vessel 204 except it has a handle 262 for users to grip the vessel 206. The external ridges 224 are no longer needed for anti-slippery reason but they could still be present in some embodiments of third vessel 206 for aesthetic reasons. The fourth vessel 208 also has a handle 262 on its side. It has two openings 220 and 222, one at the top and one at the bottom. The bottom opening 224, similar to that of the first vessel 202, has a connection mechanism such as screw threads 228 that pair with the screw threads of the blade holder 104. The fourth vessel 208 has a spout 282 at the top opening 222. A lid not shown in the figure can be used to cover the top opening 222 when the blender 100 is in operation. The designs of the third vessel 206 and the fourth vessel 208 allow users to carry the vessels and to pour out the contents in the vessels more conveniently. As described in greater detail below, the lift up of the mixing vessel 102 with blade holder 104 triggers a safety mechanism of the blender 100 and stops the blender 100 from operating immediately. Thus, a mixing vessel 102 with a handle 262 provides a safe but convenient way to operate the blender 100.

While four different embodiments of the mixing vessel 102 are shown in FIG. 4, those skilled in the art will appreciate that the vessel 102 can be in any shape and have any combination of components described above and of other features known or developed in the art. Although in some embodiments the mixing vessels 102 have two openings, one at the top and one at the bottom, mixing vessels 102 with only one opening are preferred. Since embodiments of the present invention are often used as blenders with high power motors, the contact of a rotating blade when the blender is operating could cause severe injure. The design with only one opening can completely prevent any possible contact of the blade when the blender is operating. Thus, mixing vessels without the top opening are preferred.

Figure 6:
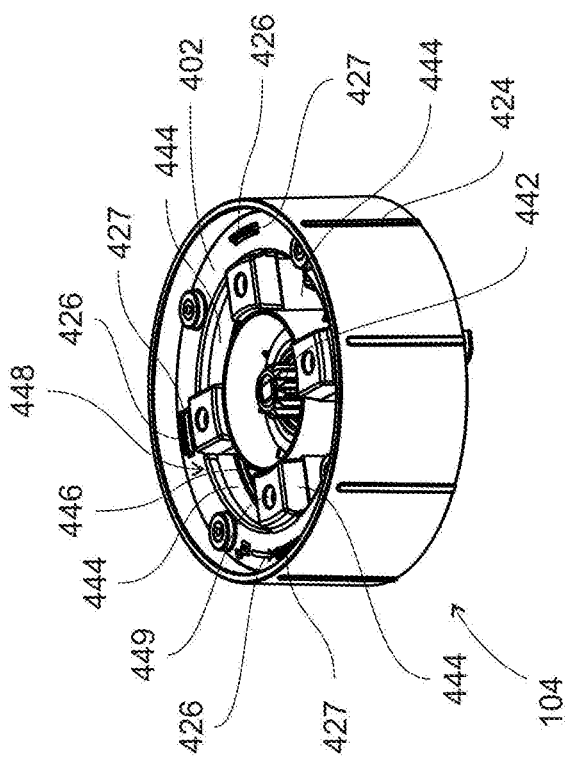
FIG. 6 is a bottom perspective view of the blade holder shown in FIG. 5 in accordance with an embodiment of the present invention.
Figure 5:
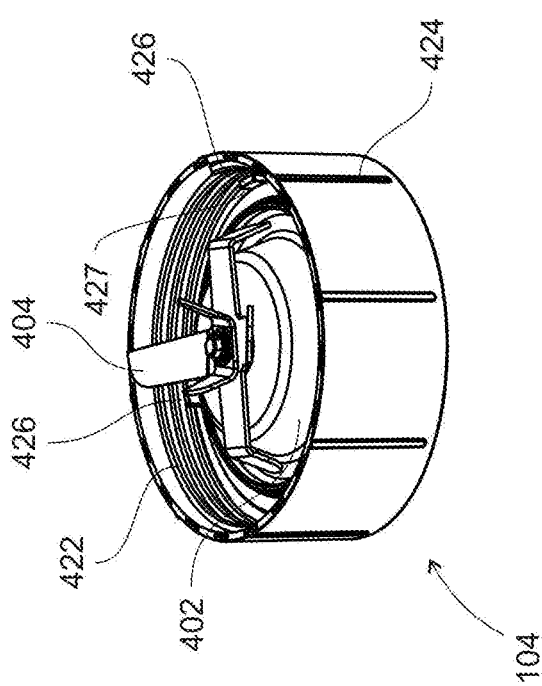
FIG. 5 is a top perspective view a blade holder in accordance with an embodiment of the present invention.
Figure 7:
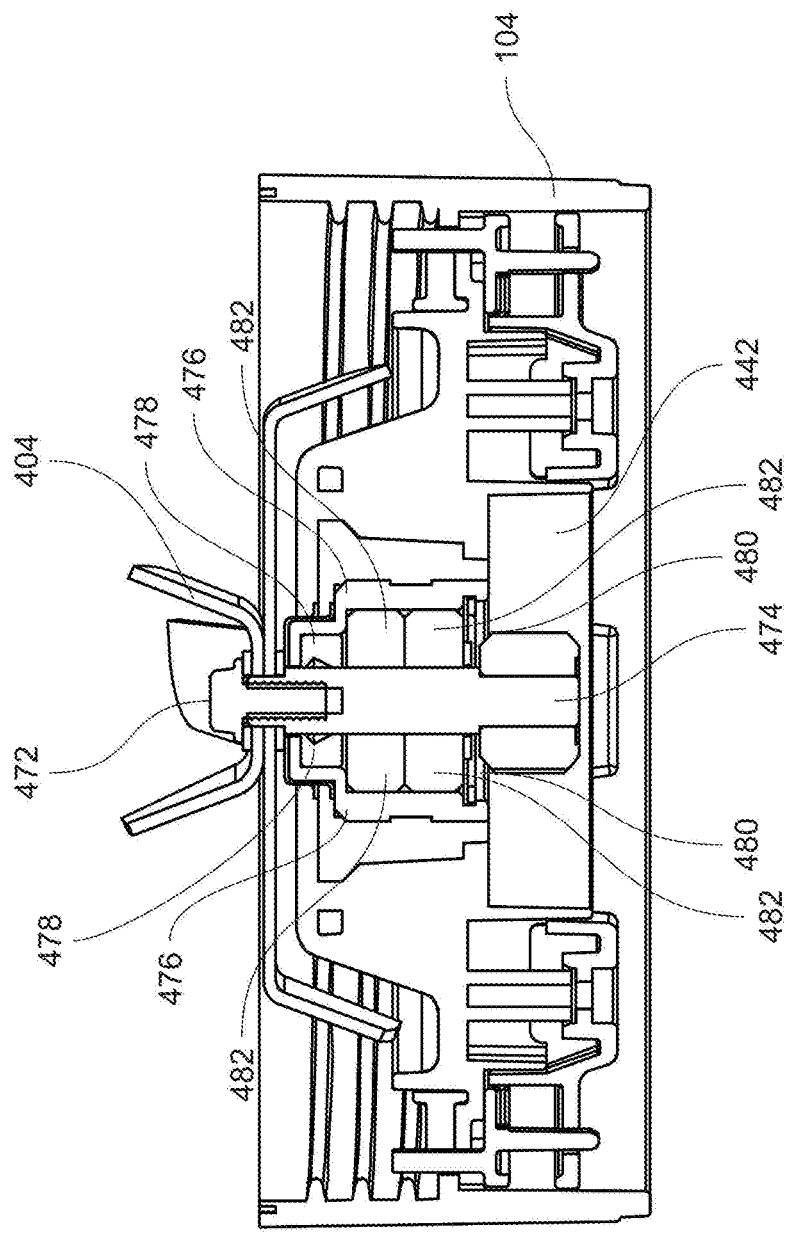
FIG. 7 is an illustrative view of the internal structure of a blade holder in accordance with an embodiment of the present invention.

FIGS. 5, 6, and 7 provide detailed illustration of a blade holder 104 in accordance with some embodiments of the present invention. FIG. 5 and FIG. 6 are the top perspective view and the bottom perspective view of a blade holder 104 respectively. FIG. 7 is an illustrative view of the blade holder 104 showing the internal structure of a blade holder 104.

Turning to FIG. 5, it shows a blade holder 104 comprising a plastic base 402 and a blade 404. The blade 404 is rotatably attached to the plastic base 402 by a mechanism that will be discussed in greater detail below in FIG. 7. The plastic base 402 has a circular cylindrical shape. On its outer wall, it has a plurality of ridges 424 to provide traction for the user to turn the blade holder 104 when the user separates the blade holder 104 from the mixing vessel 102 or screws the blade holder 104 back into the mixing vessel 102. On its inner wall, it contains a connection mechanism such as screw threads 422 that match with the connection mechanism, such as the threads 228, on the mixing vessel 102, as shown in FIG. 4.

Below the screw threads 422, a plurality of rectangular safety pins 426 are adjustable mounted on and engaged with the blade holder 104. The number of safety pins 426 can vary based on the design of the embodiments of the invention. The safety pins 426 are located inside a plurality of pin housing 427. The pin housing 427 is a cavity that creates an opening on the top surface of the blade holder 104 and an opening on the bottom surface of the blade holder 104. The safety pins 426 can slide vertically across the plastic base 402 but they are locked such that they cannot detach from the plastic base 402. When a safety pin 426 slides to its uppermost position, it protrudes from the top inner surface of the plastic base 402 while it is completely hidden on the bottom surface of the plastic base 402. When a safety pin 426 slides to its lowermost position, it protrudes from the bottom surface of the plastic base 402 while it is completely hidden on the top inner surface of the plastic 402. The protrusion of the safety pins 426 is best shown in FIG. 6. The natural position of the safety pins 426 is its uppermost position. The safety pins 426 are located at the position where the rim of a mixing vessel 102 will locate when the mixing vessel 102 is screwed into the blade holder 104. Hence, when a mixing vessel 102 is screwed into the blade holder 104, the rim of the mixing vessel 102 depresses all safety pins 426 from their natural position, which is the uppermost position, to the lowermost position that is protruding from the bottom surface. The movement of the safety pins 426 and their engagement with the rim of a mixing vessel 102 are important for one of the safety mechanisms of the blender 100, which will be discussed below in greater detail.

FIG. 6 shows a perspective view of the plastic base 402 of a blade holder 104 viewing from the bottom. For illustration purpose, the safety pins 426 are shown protruding from the bottom surface even though a mixing vessel 102 is not connected to the blade holder 104. The blade holder 104 further comprises a coupling gear 442 at the bottom center of the plastic base 402. The coupling gear 442 is connected to the blade 404 by a mechanism that will be shown and described in greater detail in FIG. 7. The coupling gear 442 matches with an impeller 602 (shown in FIGS. 8 and 9) of the motor base 102. A motor 640 inside the motor base 106 drives the rotation of impeller 602, which in turn drives the coupling gear 442, which in turn drives the rotation of the blade 404. The blade holder 104 also comprises a plurality of recesses 444. In this embodiment, the recesses 444 are defined by an inner circumferential wall 446, an outer circumferential wall 448, and two raised square shaped areas 449. The recesses 444 match with a plurality of raised areas 604 (shown in FIGS. 8 and 9) so that the blade holder 104 can properly be aligned with the motor base 106 when the blade holder 104 is inserted into the motor base 106.

FIG. 7 shows the internal structure of the blade holder 104 and the mechanism of the coupling gear 442 driving the blade 404 in accordance with some embodiments of the present invention. The blade 404 is rotatably mounted on the blade holder 104 by a screw 472, which is secured to a central axis 474 at one end. The coupling gear 442 is connected to the central axis 474 at the other end. When the coupling gear 442 rotates, it drives the central axis 474, which in turn drives the screw 472 and the blade 404 to rotate. Along a large middle portion of the central axis 474, a sleeve 476 surrounds the central axis 474. An upper seal 478 surrounds the top end of the central axis 474 and a lower seal 480 surrounds the bottom end of the central axis 474. Both seals 478 and 480 are preferably ring shaped. The sleeve 476, the upper seal 478 and the lower seal 480 define a space for two layers of pluralities of ball bearings 482 to be placed.

The internal design of the blade holder 104 provides different features that are particularly suitable for a high power blender. When a high power motor drives the coupling gear 442 of the blade holder 104, all moving components of the blade holder 104 are moving with a high rotational speed. This generates friction and a large amount of heat that could damage or even melt the plastic base 402. The central axis 474 is particularly dangerous because largely its entire surface area is inside the plastic base 402. To resolve the overheating problem, in some embodiments of the present invention, ball bearings 482 are used along the central axis 474. The ball bearings 482 reduce the surface area of the central axis 474 that is contact with other surfaces during rotation. Hence, any rotational friction is significantly reduced. Although two lawyers of ball bearings 482 are shown in the preferred embodiments, those skilled in the art will appreciate that any number of ball bearing layers can be used. The ball bearings 482 are confined by the sleeve 476. The sleeve 476 can be made of stainless steel, nylon or other effective heat dissipating materials known or developed in the art. By using effective heat dissipating materials, any heat generated by the moving components of the blade holder 104 can be dissipated quickly. Overheating can thus be prevented.

Figure 8:
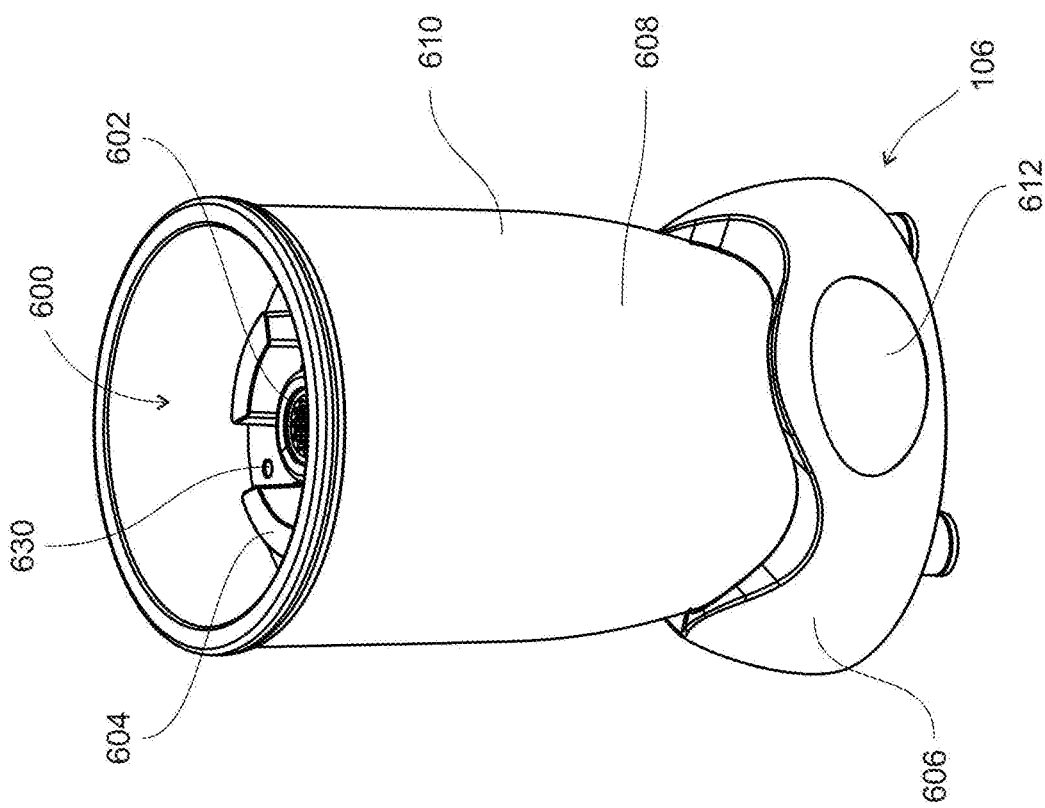
FIG. 8 is a perspective view of a motor base of a blender in accordance with an embodiment of the present invention.

Turning to FIG. 8, the figure shows a perspective view of a motor base 106 of a blender 100 in accordance with some embodiments of the present invention. The motor base 106 comprises a wave shaped skirt 606, a body 608 which contains a large motor housing 610 therein, and a well 600 above the motor housing 610. Those skilled in the art will appreciate the shapes of these components, especially the skirt 606, may vary. On the skirt 606, a plurality of switches can be present for users to control the blender 100. Alternatively, the switches can be present in other locations such as along the power cord of the blender 100.

Figure 9:
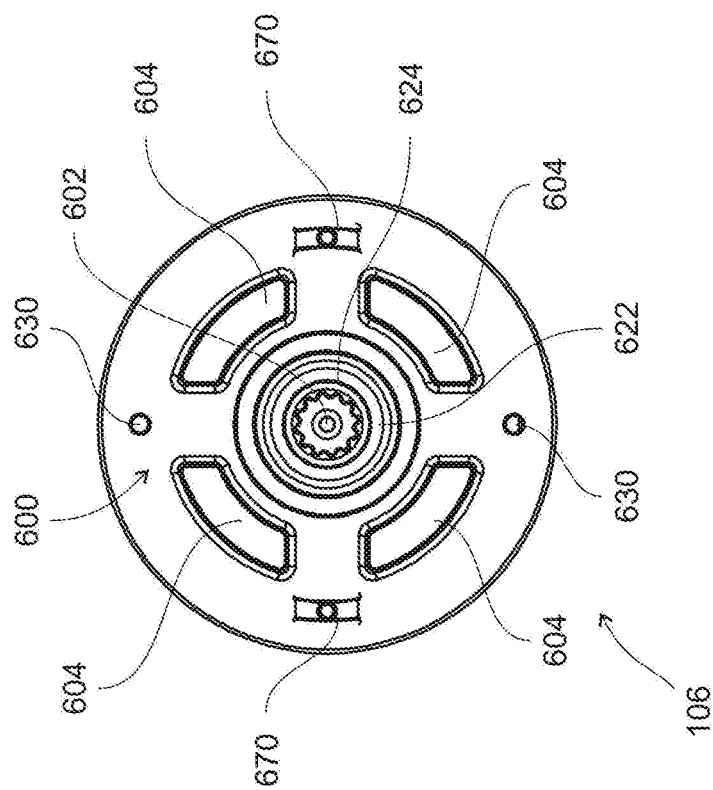
FIG. 9 is a top view of a base of a blender in accordance with an embodiment of the present invention.

FIG. 8 and FIG. 9 show the top surface of the motor base 106 and the components thereon in accordance with some embodiments of the present invention. On the surface of the well 600, a plurality of arch shaped raised areas 604 is present. The raised areas 604 and the recesses 444 are complementary to each other. The raised areas 604 match with the recesses 444 (shown in FIG. 6) so that the blade holder 104 can properly be aligned with the motor base 106 when the blade holder 104 is inserted into the well 600. Hence, the raised areas 604 can be in any shapes and at any location as long as they match the shape and the location of the recesses 444 at the bottom of the blade holder 104.

In some alternative embodiments of the present invention, the raised areas 604 are on the inner wall of the well 600. In these alternative embodiments, the recesses 444 are also on the outer wall of the blade holder 104 rather than underneath the blade holder 104. The idea for the alternative embodiments is similar to the idea in FIG. 8. The raised areas 604 and the recesses 104 match in shape and location and are complementary to each other. When the blade holder 104 is inserted into the well 600 of the motor base 106, the raised areas 604 and the recesses 104 align the blade holder 104 and the motor base 106.

In some embodiments, the surface of the well 600 also contains an impeller 602 at its center. Underneath the surface of well 600, the motor base 106 includes a motor 640 (shown in FIGS. 14 and 15) that is coupled to the impeller 602. The impeller 602 comprises an outer ring 622 and an inner ring 624. The outer ring 622 is mounted on the motor base 106 and is stationary when the impeller 602 is rotating. The inner ring 624 is the rotational part that is driven by the motor 640. The inner wall of the inner ring 624 has teeth that match with the teeth of the coupling gear 442 (shown in FIG. 6) at the bottom of the blade holder 104. The matching of teeth allows maximum torque transfer without slipping. When a closed container 102, formed by a blade holder 104 coupling with a mixing vessel 102, is inserted into the well 600, the inner ring 624 couples with the couple gear 442. This allows the motor 640 to indirectly drive the blade 404 through the impeller 602 and the coupling gear 442. For a high power motor 640, the friction between the outer ring and the inner ring 624 could result in overheating. In some preferred embodiments, the inner ring 624 interacts with the outer ring 622 through a plurality of ball bearings (not shown) to reduce friction and heat generated. The ball bearings and the rings are also lubricated to further reduce friction and heat generated. The structure and design of the impeller 602 can be similar to the internal structure described in FIG. 7.

In some embodiments, the surface of the well 600 also contains a plurality of drainage holes 630. Since the motor housing 106 contain different electrical components such as the motor 640, washing it is usually not recommended to protect the electrical components from any damages. Yet, the usage of the blender 100 would accumulate dirt in the well 600 and sometimes the contents in the mixing vessel 102 may drop onto the surface of the well 600. For example, liquid may leak from the mixing vessel 102 to the well 600 during blending due to worn out of the material, defective gasket or improper installation. Owing to the features of the well 600, such as various raised areas 604, liquid can easily accumulate in the well 600 if the well 600 is not properly and complete dried. Any liquid accumulated could slowly create rusting of the metallic components on the well 600, such as the impeller 602. Moreover, liquid could slowly enter the internal housing 610 of the motor base 106 through the impeller 602 because impeller 602 is a rotational component that cannot be completely sealed. Any liquid entered the internal housing 610 could damage the impeller 602 and the motor 640 and affect the lubrication of the impeller 602. This severely affects the blender's functionality and durability. The drainage holes 630 allow any liquid to be drained from the surface of the well 600 to travel through the drainage holes 630 and tunnels 632 (shown in FIG. 14) that are connected to the drainage holes 630. Through the drainage holes 630, liquid will travel through the tunnels 632 and escape the bottom of the motor base 106 without the chance to enter the internal housing 610 of the motor base 106. The drainage holes prevent any liquid from accumulating. This reduces the chance of rusting and any damage to the moving and the electrical components.

In some embodiments, the surface of the well 600 also contains a plurality of safety actuators 670 extending upward from the surface of the well 600. The safety actuators 670 are pressure-activated switches. The safety actuators 670 is connected to a mechanism, which will be discussed in greater detail below, to complete the circuit of the motor 640 when the safety actuators 670 are pressed downward. In preferred embodiments, all safety actuators 670 must be pressed downward in order to complete the circuit. The motor 640 can only operate when its circuit is complete. Hence, if any one of the safety actuators 670 is not pressed, the motor will not be turn on even though the user turns on the blender.

The safety actuators 670 and the safety pins 426 (shown in FIG. 6) together provide a safety mechanism for the blender 100 to ensure that the motor 640 cannot operate to drive the blade 404 when the blade holder 104 is not covered by a mixing vessel 102. The safety actuators 670 are located at the position where the safety pins 426 will be locate when the blade holder 104 is inserted into the well 600 of the motor base 106. When the blade holder 104 is inserted into the well 600, the recesses 444 underneath blade holder 104 match with the raised areas 604 on the surface of the well 600 to align the blade holder 104 with the motor base 106. Owing to the alignment, the safety pins 426 can only be located at certain positions. The safety actuators 670 are located at such positions. Moreover, the shapes of the safety actuators 670 and the safety pins 426 are complementary to each other. When a mixing vessel 102 is not screwed onto the blade holder 104, the safety pins 426 are in a retracted position, which, as discussed above, is its natural and uppermost position. Therefore, the safety pins 426 do not extend from the bottom of the blade holder 104. When the mixing vessel 102 is screwed into the blade holder 104, the rim of the mixing vessel 102 depresses the safety pins 426 from their uppermost position to their lowermost position, causing the safety pins 426 to extend out from the bottom of the blade holder 104. When these safety pins 426 protrude from the blade holder 104, and the user insert the blade holder 104 into the well 600 of the motor base 106, the safety pins 426 slide into the complementary sockets of the safety actuators 670 on the surface of the well 600. The safety actuators 670 are depressed by the safety pins 426 and the motor circuit closes, allowing the motor 640 to turn on.

If the mixing vessel 102 is not screwed into the blade holder 104, the safety pins 426 are at its natural uppermost position. They do not extend out from the bottom of the blade holder 104. They are unable to depress the safety actuators 670. Alternatively, in some other embodiments, the safety pins 426 can slide freely when the mixing vessel 102 is not screwed into the blade holder 104. Thus, these safety pins 426 do not exert sufficient pressure or force to depress the safety actuators 670. These safety mechanisms prevent the motor 640 from turning on unless the mixing vessel 102 is screwed into the blade holder 104 before placing, it on the motor base 106. This prevents the blade 404 from moving when it is not covered by the mixing vessel 102. Hence, a user cannot insert only the blade holder 104 alone into the well 600, turn on the motor 640 and cause the blade 404 to rotate without a cover. This significantly reduces the chance of injury caused by the blade 404.

Besides the safety mechanism, the interaction between the safety actuators 670 and the safety pins 426 also allows the blender 100 to be used more conveniently. In some embodiments, unlike many electrical appliances, the default status of the blender 100 is set as "on," meaning the user is not required press any button to cause the blender to operate. The user is only required to put the food into the mixing vessel 102, screw the blade holder 104 in to connect it to the mixing vessel 102, insert the blade holder 104 into the well 600 of the motor base 106 to align the blade holder 104 with the motor base 106, then the motor 640 will automatically be turned on and the blade 404 will start rotating to blend the contents in the mixing vessel 102. This is because when the blade holder 104 is properly aligned with the motor base 106, the extended safety pins 426 will depress the safety actuators 670 to complete the motor's circuit, causing the motor with default "on" status to operate. In some preferred embodiments, the blade holder 104 is not locked to the motor base 106 by any means. Users can freely and immediately lift the blade holder 104 and the mixing vessel 102 at any time. Hence, when the blender 100 is operating to blend the contents in the mixing vessel 102, the user can remove stop the blender 100 by simply removing the blade holder 104 and the mixing vessel 102 from the motor base 106. Since it is normally difficult to see the content in turbulence when it is being blended, such mechanism allows the user to examine the content more conveniently. The user may simply lift the mixing vessel 102 so that the blade 404 stops rotating, examine the extent of blending of the content, put the mixing vessel 102 and the blade holder 104 back into the well 600 for more blending if necessary. The entire process is automatic because the user is not required to press any button. The motor is set as default "on," unless the user turns the switches of the blender to "off."

In some embodiments, a special type of switch is used to control the operation of the blender 100 in additional to or in replace of the default "on" system. The special switch is a push button switch where the button can be pushed in halfway as a pulse function. Thus, the special switch has at least three positions, a released position, a first depressed position and a second depressed position. When the button is pushed halfway, it is at its first depressed position. The switch will complete the circuit and the motor 640 will operate. Yet, as soon as the button is release, the button will return to its released position, opening the circuit and turning the motor 640 off. Thus, when the button is pushed only to its first depressed position, the user is required to hold the button in position in order for the motor 640 to continue to operate. The button can also be pushed fully to reach its second depressed position, then the switch will be locked in the "on" position and will not automatically return to its released position. The user now is not required to hold the button for the motor 640 to operate. In order to turn the motor 640 off, the button must be fully pushed again. Since pushing the button fully to turn on or off the motor creates a time delay in operating the blender 100 the halfway button feature provides a convenient means for the user to stop the blender 100 to examine the contents in the mixing vessel 102 and restart the blender 100 to perform more blending. In these embodiments, lifting the mixing vessel 102 is no longer required to turn off the blender, the mixing vessel 102 and the blade holder 104 can be locked to the motor base 106 by any means that is known and developed in the art.

Figure 10:
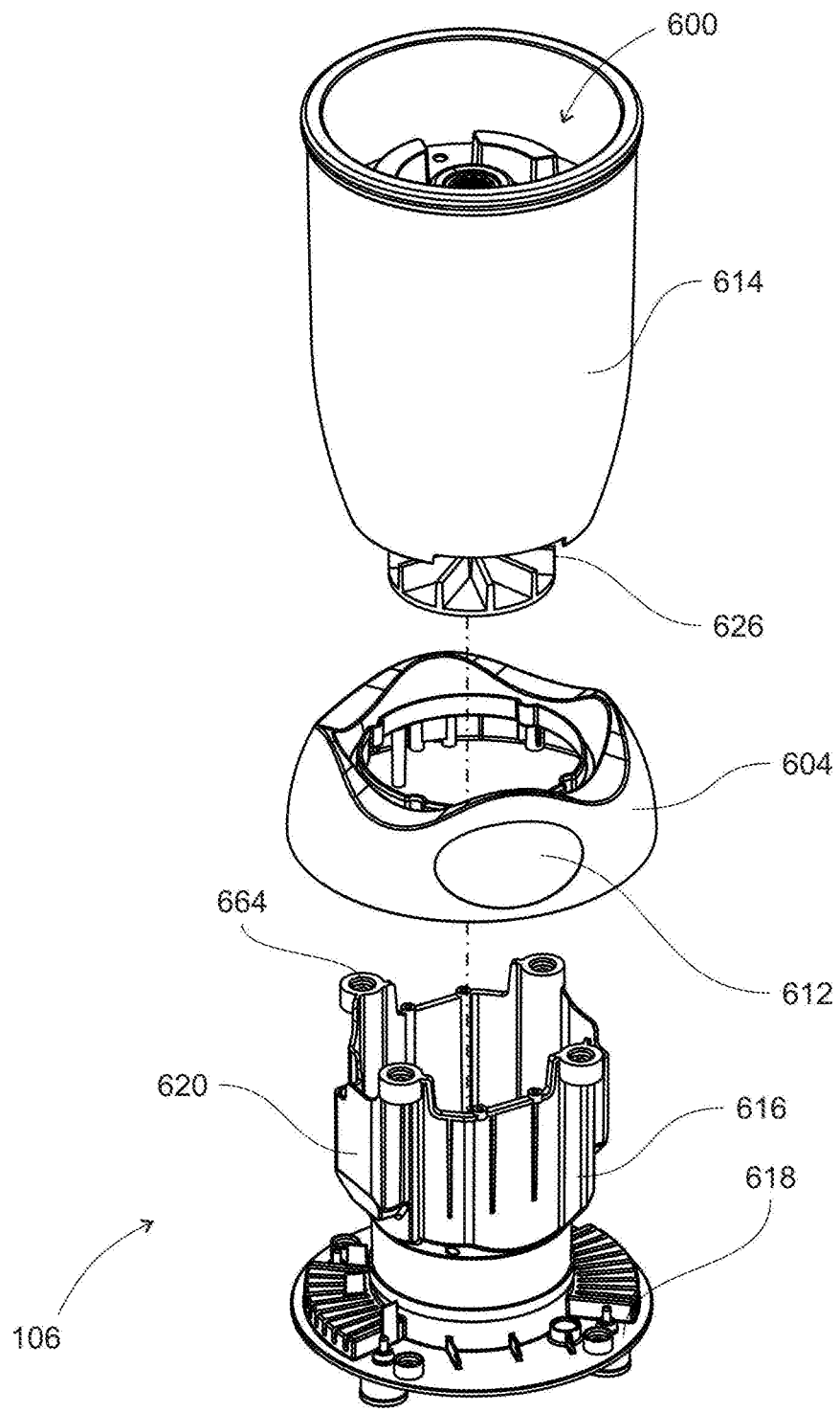
FIG. 10 is an exploded perspective view of a motor base of a blender in accordance with an embodiment of the present invention.

Now turning to FIG. 10, the figure is an exploded perspective view of a motor base 106 in accordance with some embodiments of the present invention. The motor base 106 mainly comprises of three parts—an upper part 614 that includes the well 600 and the motor housing 610, the wave shaped skirt 606, and the bottom cover 616. The upper part 614 is can be inverted cone or dome shaped housing body with the well at its upper portion and the motor housing 610 at its lower portion. In some embodiments, the width at its lower portion is narrower than the width at its upper portion. Thus, when the upper part 614 is viewed together with an inserted mixing vessel 102, the combined shape resembles a bullet. Although those skilled in the art will appreciate that the upper part 614 can be in any shape, the inverted cone or dome shaped housing body of the upper part 614 could serve some functional purposes that will discuss in greater detail below in addition to aesthetic purposes. The bottom cover 616 mainly comprises a plate 618 and a cup shaped housing 620. The diameter of the plate 618 should match with the diameter of the skirt 606. The skirt 606 is preferably wider than the upper part 614 to provide sufficient mechanical support to the blender 100 so that it can stand upright firmly, especially when the vibration and the geometry of a blender could cause the blender without a wide base to fall. A fan 626, which is connected to the motor 640, located outside the motor housing 610 to provide cooling to the motor 640. When the bottom cover 616 is connected to the upper part 614, the fan 626 is located inside the cup shaped housing 620. The motor housing 610 can be made of any material, but metal alloy is preferred because it helps to dissipate heat and provide mechanical protection and support to the blender.

Figure 11:
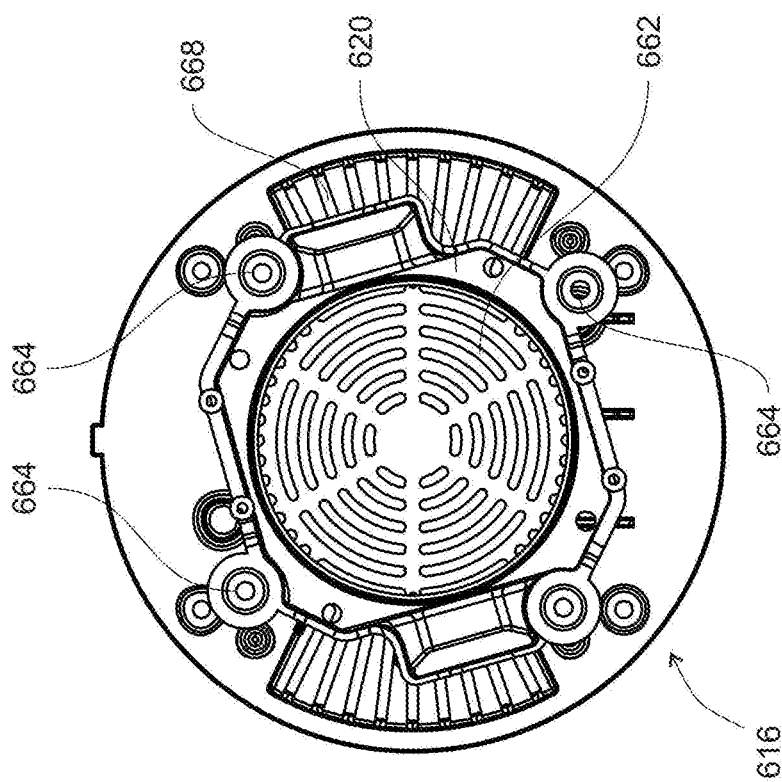
FIG. 11 is an isolated top view of the bottom cover of the base of shown in FIG. 10 in accordance with an embodiment of the present invention, viewing from the top.

FIG. 11 is a top view of the bottom cover 616 in accordance with some embodiments of the present invention. The bottom cover 616 contains a plurality of openings 662. The openings allow air to pass through to dissipate heat through the fan 626. The bottom cover 616 also includes a plurality of openings or structural elements 664 on the outer wall of the cup shaped housing 620. The structural elements 664 allow the tunnels 632 of the drainage holes 630 to be placed. It is noteworthy that the structural elements 664 are on the outer wall of the housing 620. Thus, liquid on the surface of the well 600 can pass through the drainage holes 630 and tunnels 632 and leave the motor base 106 through the bottom cover 626 without any chance of entering the any internal housings of the motor base 106. There is also a plurality of openings 668 that are outside the cup shaped housing 620. These openings 668 are provided for liquid from the drainage holes 630 to escape the motor base 106. The structural elements 664 also allow any electrical cables inside the motor housing 610 to pass.

Figure 12:
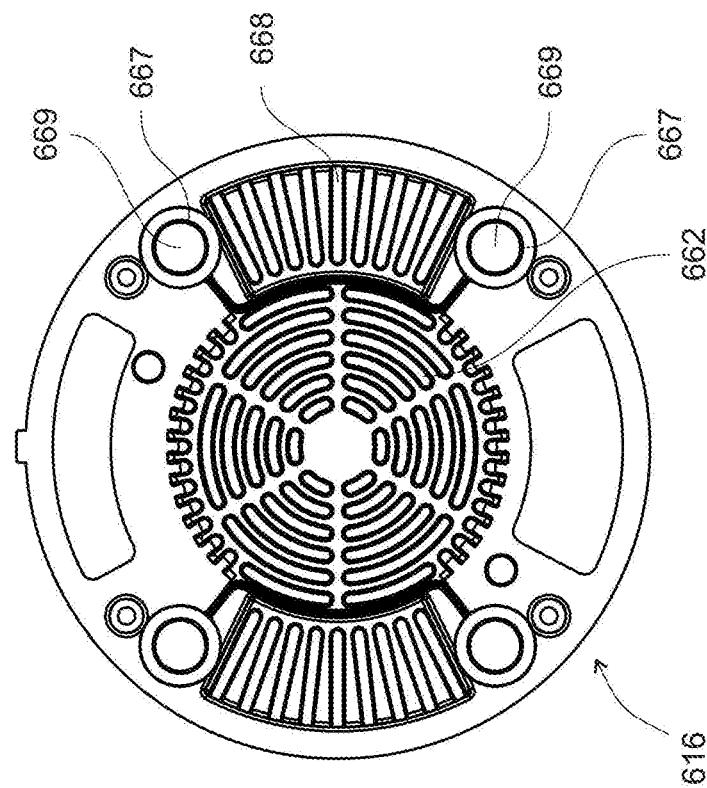
FIG. 12 is an isolated bottom view of a bottom cover, a part shown in FIG. 10, of the motor base shown in FIG. 10 in accordance with an embodiment of the present invention, viewing from the bottom.

FIG. 12 is the same bottom cover 616 viewed from the bottom. The bottom cover 616 includes a plurality of legs 669. Each leg 669 has a plastic cushion 667 underneath it. Although viewing from the bottom the openings 668 and the openings 662 are similar, they serve different purposes and are isolated from each other by the wall of the cup shaped housing 620.

FIG. 13 is a bottom view of the motor base 106 in accordance with some embodiments of the present invention. Viewed from its bottom, the upper part 614 comprises an outer circumference 642, a metallic ring 644, a plurality of screw holes 646, a cable holder 648, and the motor housing 610. Viewed from the top, as best shown in FIG. 10, the upper part 614 also comprises a well 600 and different components on the well 600, which have been discussed in great detail above concerning FIGS. 8 and 9. The outer circumference 642 defines the width of the motor base 106. As shown in FIG. 10, the shape of the motor base 106 resembles an inverted dome shape with its width increases from bottom to top. Thus, the outer circumference 642 also increases from bottom to top but it is not shown in FIG. 13. The metallic ring 644 defines the entrance of the motor housing 610. Preferably, the width of the motor housing 610 is width than the diameter of the metallic ring 644. In other words, the metallic ring 644 is installed after the motor 640 is placed and secured in the motor housing 610. This prevents the motor 640 from falling out because the metallic ring 644 will block it. The metallic ring 644 is mounted and secured on the motor housing 610 by a plurality of screws. On the metallic ring 644, two tubes 650 are present. The tubes 650 are connected to the tunnels 632 of the drainage holes 630 as part of the tunnels 632. The upper part 614 also contains a plurality of raised screw holes 646 for the wave shaped skirt 606 and the bottom cover 616 to be mounted on the upper part 614 by a plurality of screws. It is noteworthy that when the blender 100 is in its completed stage and the bottom cover 616 is connected to the upper part 614, part of the cup shaped housing 620 of the bottom cover 616 is inserted into the motor housing 610. Therefore, part of the cup shaped housing 620 passes the entrance of the motor housing 610 that is defined by the metallic ring 644. This completely isolates the motor housing 610 from the rest of the space outside the entrance defined by the metallic ring 644. Yet, electrical cables must extend from the inside of the motor housing 610 to the outside of the blender 100. The structural elements 664 on the outer wall of the cup shaped housing 620 provide spaces for the electrical cables to pass through. The electrical cables are then collected and held by the cable holder 648.

The motor housing 610 is the main house of the blender 100 at which the motor 640 locates. The motor 640 is connected to a fan 626. The fan is located outside the motor housing 610 at a position outside the motor housing entrance that is defined by the metallic ring 664. The location of the fan 626 allows the fan 626 to operate at a less confined space to maximize its cooling effect.

Now turning to FIG. 14, the figure is an illustrative drawing of the internal structure of the motor base 106 showing the motor housing 610 in accordance with some embodiments of the present invention. FIG. 14 shows the drainage hole 630 and its connection with the tunnel 632, FIG. 14 also shows the actuator 670 that is connected to the circuit of the motor by a switch mechanism 672. The switch mechanism could be any mechanism that is known or developed in the art. The motor housing 610 contains a motor 640. In some preferred embodiments, the motor 640 is a high power motor with at least one thousand watt (1000 W) power. In a preferred embodiment, the motor 640 is 1200 W. Those skilled in the art will appreciate the power of the motor 640 can vary and will depend on the design and the primary intended use of the blender 100. Furthermore, other lower power motors can also be used with the design and the features disclosed in the embodiments of the present invention. Yet, high power motors are usually associated with problems that are unique or significantly more severe than lower power motors. The features disclosed in the embodiments of the present invention mainly address the problems of a high power motor, such as safety, vibration and overheating.

The motor 640 is not directly mounted on any wall of the motor housing 610. Instead, it is mounted on a motor bracket 652. The motor bracket 652 is only connected to the ceiling of the motor housing 610 through a plurality of rubber dampers 654. The motor 640 with the motor bracket 652 is not connected to any other part of the motor housing 610. In other words, the rubber dampers 654 are the only connection points between the motor bracket 652 and the motor housing 610. Hence, the motor 640 suspends from the ceiling of motor housing 610. The motor 640 drives the impeller 602 through an axis 656.

The connection of the motor 640 to the motor housing 610 through the motor bracket 652 is best illustrated by FIG. 15. FIG. 15 is an inverted view of the components inside the motor housing 610. The lower part, which resembles a base, is in fact the well 600 of the motor base 106. The fan 626 is at the top of the FIG. 15. The motor bracket 652 comprises a circular dish 6522 and three rectangular extensions 6524 extending from the circumference of the circular dish 6522. The rectangular extensions 6524 are where the rubber dampers 654 locate. The rubber dampers 654 have two pieces, an outer piece and an inner piece. The rectangular extensions 6524 of the motor bracket 654 are placed. In between the two pieces of the rubber dampers 654. The two pieces of the rubber dampers 654, the motor bracket 652 and the motor housing 610 are connected together by a screw. The screw can be a separate piece or can be a part of the outer piece of the rubber dampers 654. The rubber dampers 654 are preferably made of rubber but can be made of all other soft material known or developed in the art. High power motors, especially those over 1000 W in power, often create unmanageable vibration for a blender to be used or even to stand upright. If such high power motors are directly connected to any part of the motor housing 610, the vibration will directly transfer to the motor base 106, rendering the blender 100 unusable or unsafe to use. The motor 640 is now mounted only on the motor bracket 652. When the vibration is transferred to the motor bracket 652, the motor bracket 652 will vibrate in vertical direction. The outer piece and the inner piece of the rubber dampers 654 will act as cushioning layer to prevent significant amount of the vibration from transferring to the motor housing 610 and also the motor base 106. The vibration of the motor bracket 652 due to a high power motor 640 could be very strong. Since the motor 640 suspends from the ceiling of the motor housing 610, the connection points at the rubber dampers 654 have to withstand the strong vibration and the weight of a relatively heavy high power motor 640. An old or defective motor bracket 652 could be broken due to the vibration and the weight. Thus, additional safety feature is desirable to prevent a broken motor bracket 652 from causing the motor 640 to fall. In some embodiments, as discussed above, the entrance of the motor housing, defined by the metallic ring 644, is smaller than the widest part of the motor 640. Thus, the cone shaped or inverted dome shaped upper part provides an important safety feature of the blender 100.

Although the motor 640 can be connected to the motor housing 610 by other means, the arrangement of the motor housing 610 suspending from the ceiling of the motor housing 610 through the motor bracket 652 at the connection points of rubber dampers 654 produces least amount of vibration to the blender 100 and significantly reduces the size of the motor housing 610. The feature is of particular importance when a high power motor 640 is used in a confined motor housing 610, such as the ones that have the cone shape or inverted dome shape. Another advantage of the motor 640 suspending from the ceiling of the motor housing 610 is that it allows maximum ventilation from the fan 626. It is because no structural element or bracket that would block some of the ventilation are present at the bottom of the motor housing 610. Since a relatively large fan 626 is required to be used to provide sufficient cooling of the high power motor 640, the fan 626 is located outside the motor housing 610 to limit the size of the blender 100 by limiting the size of the motor housing 610 without compromising the cooling effect of the fan 626.

The motor housing 610 also contains other components. Tunnels 632 are connected to the drainage holes 630 and have outlets at the bottom of the motor housing 610. The outlets are connected to the tubes 650 on the metallic ring 644. Hence, liquid can travel from the drainage holes 630, through the tunnels 632 and the tubes 650, to the bottom cover 616 and escape the motor base 106 through the openings 668. The motor housing 610 also contains switch means 633 that are connected to the motor 640. The switch means 658 are part of the circuit of the motor 640. The switch means 658 are underneath the safety actuators 670. When the safety actuators 670 are pressed by the safety pins 426 by the mechanism discussed in detail above, the safety actuators 670 in turn press the switch means 658, causing all switch means 658 to complete the circuit of the motor 640.

In some embodiments of the present invention, the electronic design of the circuit of the motor 640 provides features that prevent overheating and improves the durability of the blender 100. In some embodiments, the circuit of the motor 640 is a printed circuit board programmed with a soft start function that allows the motor 640 to start slower than its maximum speed, regardless the start is caused by completion of the circuit through the safety actuators 670 or users manually pressing the switches 612. The motor starts with a slower rotational speed then gradually increases its speed to maximum in a short duration. Yet, the duration is longer than that of a motor with a general circuit to reach its maximum speed. Normally, for a high power motor 640, the maximum rotational speed is very high. Turning on a high power motor 640 will result in a surge in torque to move all moving components of the blender 100 from stationary to their maximum rotational speed. The surge in torque entails high mechanical stress on the machine, which results in increased wear of all moving components of the blender 100. It also generates a large amount of heat and could result in overheating. The soft-start circuit of the blender 100 allows the torque and rotational speed of the moving components to build up in a relatively gradual fashion. This prevents excessive torque that initially occurs when the motor 640 is first turned on, thereby preventing damage to the blades 404, the impeller 602, the ball bearings 482 and/or motor 640 and overheating of any components of the blender 100.

In some embodiments, besides the soft-start feature, the circuit of the motor 640 also includes an internal timer that is programmed to automatically turn off the motor 640 after a predetermined duration. In some embodiments of the present invention, the motor 640 has over a thousand watts of power. The motor 640 and all moving components generate large amount of heat even with various features to dissipate heat and proper lubrication. Prolonged operation of the blender 100 could cause overheating and damages to the components of the blender 100. The timer limits the operation of the motor 640 to a predetermined duration. The circuit is programmed to cut off the power to the motor 640 when the motor 640 continuously operates for more than the duration. The motor 640 will be turned off until the user manually turn off the circuit by lifting the blade holder 104 to release the safety actuators 670 and restart the motor again by re-pressing the safety actuators 670 or by manually pressing the button of the switch again. This prevents the blender 100 from continuously operating in the situation such as when the users forget to turn off the blender 100.

FIG. 16 shows isolated view of a blade 404 in accordance with some embodiments of the present invention. Different kinds of blades 404 have different effect and efficiency on the cutting and blending of different kinds of food. Hence, the blade 404 is different for different embodiments of the present invention. In one embodiment, the blade has only two pieces. Yet, in other embodiments, the blade 404 has four pieces. Some of the blades 404 have teeth on it. The blades 404 in some embodiments are flat, while others have pieces extending out of their plane at various angles.

FIGS. 17-31 show blenders 800 and 900 in accordance with other preferred embodiments of the present invention. In the embodiments shown in FIGS. 17-31, the blenders 800 and 900 employ a system of emitters and detectors, as described more particularly below, to activate the motor and also to regulate its operating speed.

Figure 30:
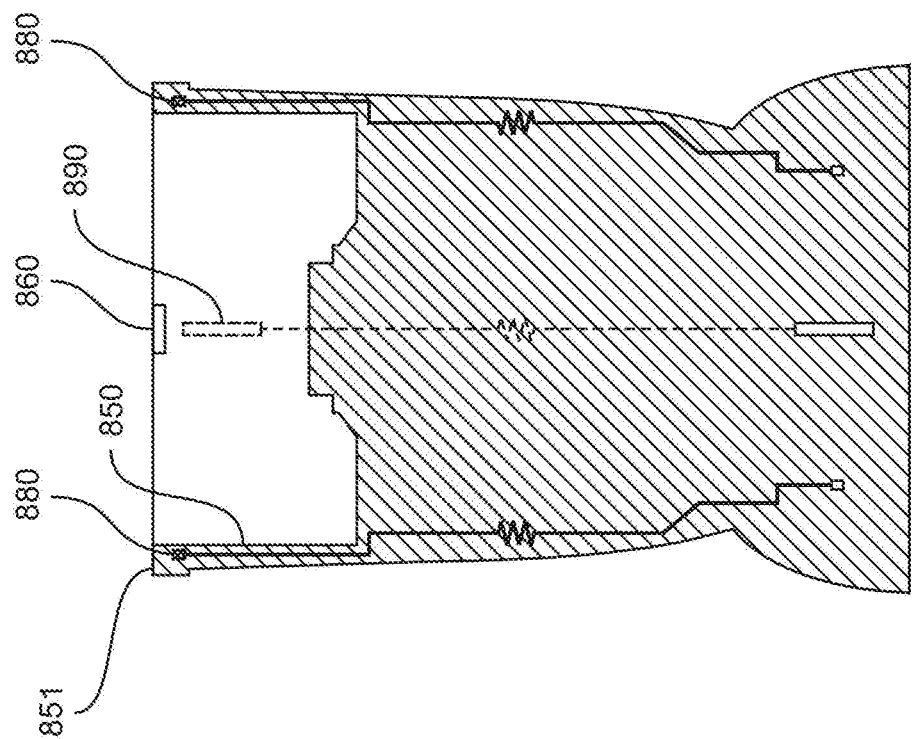
FIG. 30 is a back cross-section view of the base in accordance with an embodiment of the present invention.
Figure 29:
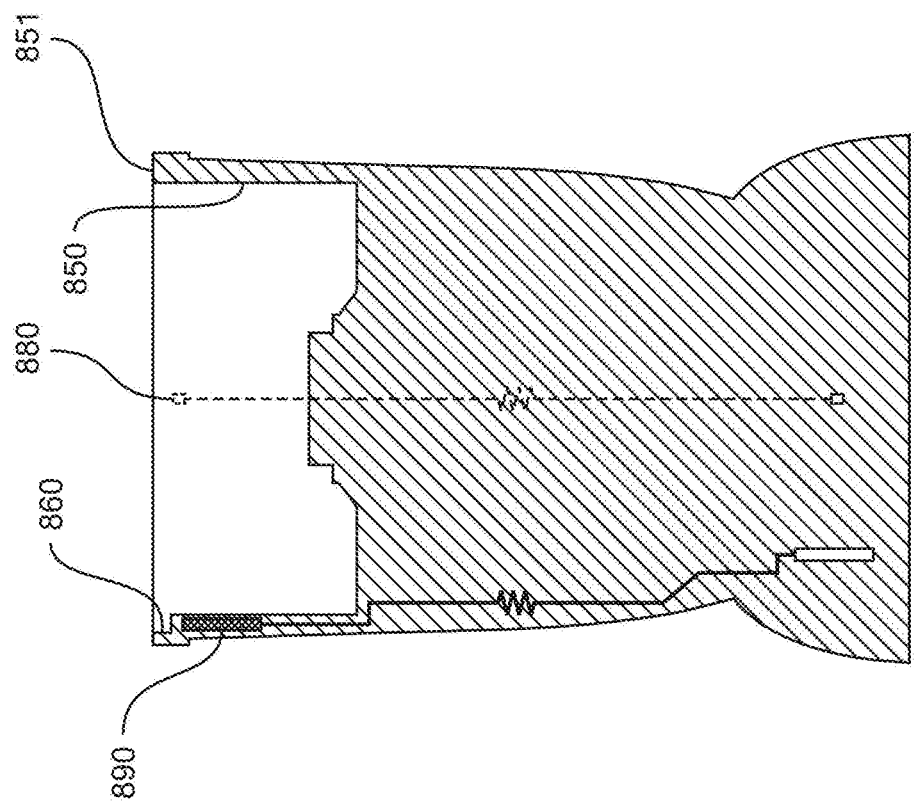
FIG. 29 is a side cross-section view of the base in accordance with an embodiment of the present invention.

In an embodiment of the invention shown in FIGS. 17-22, the blender 800 comprises generally of a mixing vessel 810 (best shown in FIGS. 19-22), a blade holder 104 (best shown in FIG. 3), and a motor base 106 (best shown in FIGS. 29-30). The blade holder 104 is removably attachable to mixing vessel 810 by screw-fit relations 103 to form a closed container for the mixing and blending of food and liquid. The mixing vessel 810, with the blade holder 104 attached, can be affixed to the motor base 106 as shown in FIGS. 17-48.

Figure 17:
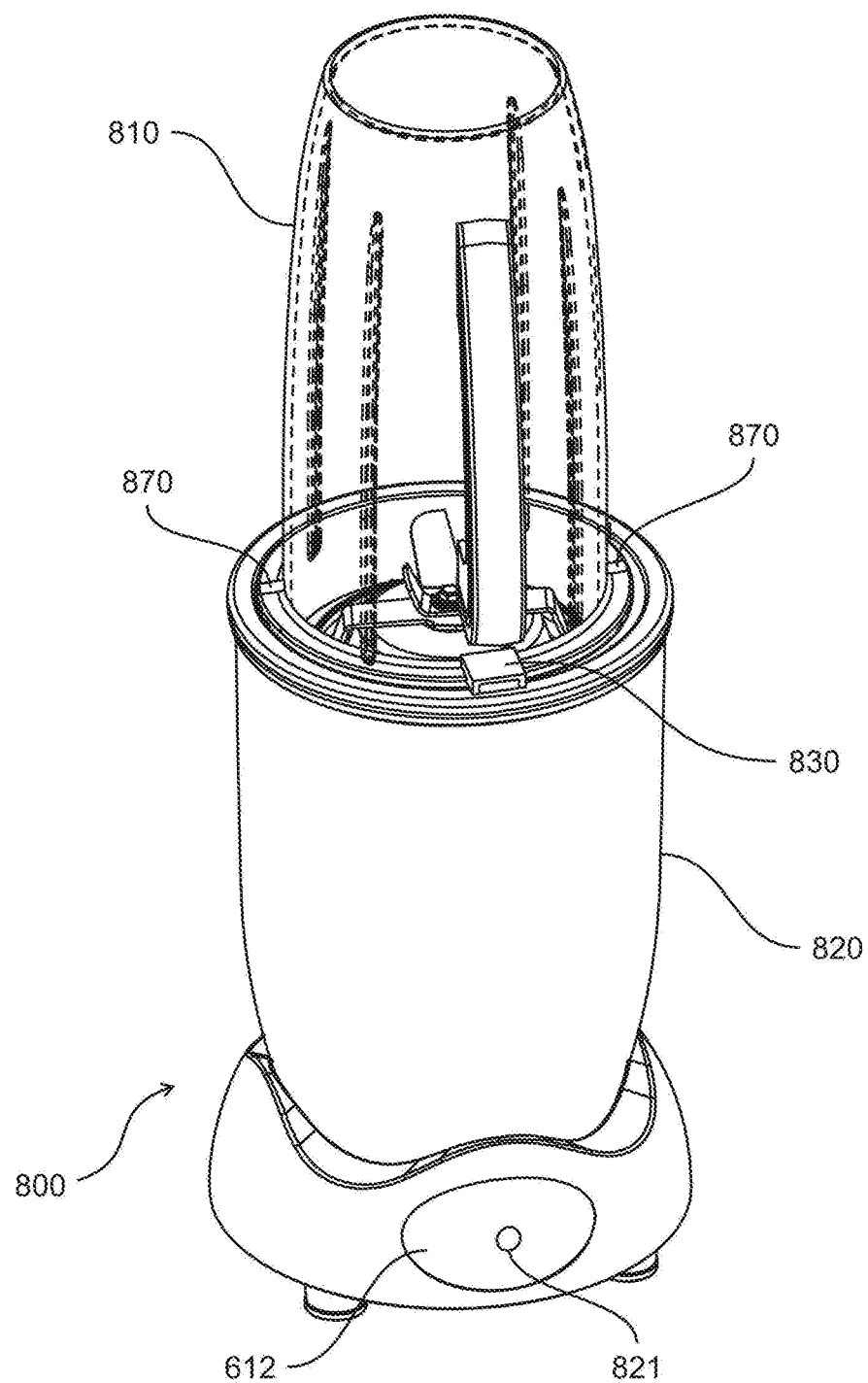
FIG. 17 is a perspective view of a blender in accordance with an embodiment of the present invention with mixing vessel with one open end.
Figure 18:
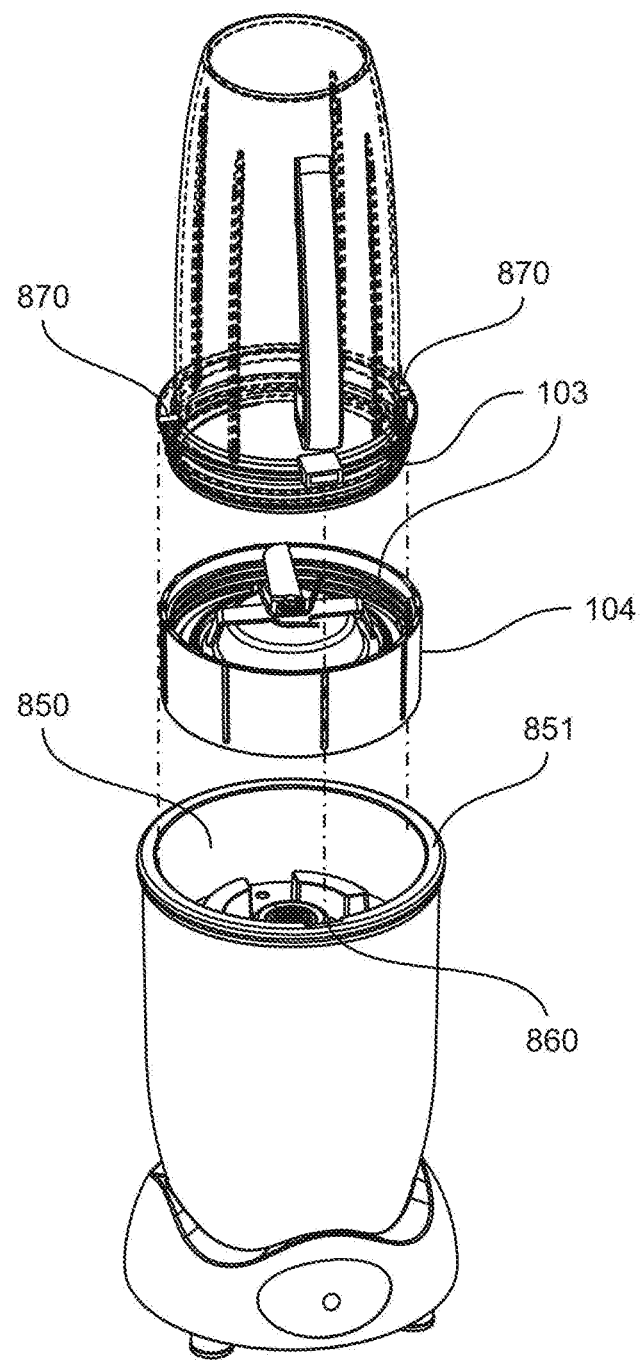
FIG. 18 is a perspective view showing the assembly of a mixing vessel with one open end, blade holder, and base in accordance with an embodiment of the present invention.

As shown in FIGS. 19-22, the mixing vessel 810 has a protrusion 830 and a lip 840. Other embodiments may have more than one protrusion 830. The lip 840 has a circumference that substantially matches the outer circumference of the blade holder 104 such that when the blade holder 104 is affixed to the motor base 820, the lip 840 is substantially flush with the inner surface of well 600 and the top edge of the well wall 851, as shown in FIGS. 17 and 18. The protrusion 830 extends further than the lip 840. FIGS. 19 and 20 are side views of the mixing vessel 810 showing the extension of protrusion 830 beyond lip 840.

As shown in FIG. 18, the rectangular protrusion 830 is complementary to a rectangular recess 860 (best shown in FIGS. 29 and 31) in the top edge of the well wall 851. If other embodiments have more than one protrusion 830, one skilled in the art would also include more than one rectangular recess 860. In this embodiment, when the mixing vessel 810, with the attached blade holder 104, is placed into the well 600 of the motor base 106, the protrusion 830 functions to secure the mixing vessel 810 in the operating position by engaging the rectangular recess 860. The protrusion 830 rests within the recess 860 so that the mixing vessel 810 does not move when the blender 800 is activated. Alternatively, one skilled in the art can appreciate that the protrusion 830 may physically attach to the recess 860 through a snap closure or locking mechanism to further secure the mixing vessel 810. Furthermore, one skilled in the art can also appreciate that the protrusion 830 and recess 860 can have a variety of geometric shapes, such as circles, triangles, or other decorative shapes, besides the rectangular shape illustrated.

The embodiment of the invention as described by blender 800 has emitters 870 and detectors 880. In the preferred embodiment, the blender 800 is automatically activated as follows. When the mixing vessel 810, with the attached blade holder 104, is placed into the well 600 of the motor base 820, the motor base 820 is automatically activated. In this preferred embodiment, the mixing vessel 810 has at least one emitter 870 embedded in the lip 840. One skilled in the art may position the emitter 870 in other positions on the mixing vessel 810. In a preferred embodiment of the invention as shown in FIGS. 19 and 20, the lip 840 has two embedded emitters 870. The emitters 870 embedded in lip 840 are flush with lip 840 as shown in FIGS. 21 and 22. Other embodiments can include additional emitters in different locations or utilize multiple emitters of varying types known in the art.

In this preferred embodiment, the motor base 820 has detectors 880 corresponding to the emitters 870 in lip 840 of the mixing vessel 810. FIG. 30 illustrates a cross-section of the internal structure of base 820. As shown in FIG. 30 in the preferred embodiment, detectors 880 are embedded within the well wall 850 in proximity to the top edge 851. While the positions of detectors 880 should correspond with the positions of the emitters 870 on the mixing vessel 810, detectors 880 can be positioned by those skilled in the art to other positions in blender base 820. The emitters 870 and detectors 880 are technology, known by those skilled in the art, that can emit and detect a signal without any physical interaction between the emitter and detector.

In this embodiment, when the mixing vessel 810, with the attached blade holder 104, is placed into the well 600 of the motor base 820, the protrusion 830 orients the mixing vessel 810 when it is engaged with the recess 860 such that the emitters 870 on the lip 840 of the mixing vessel 810 are positioned to interact with the detectors 880 embedded in the well wall 850. When the emitters 870 interact with the detectors 880, the blender 800 is automatically activated to blend the contents in the mixing vessel 810. In an alternative embodiment of the invention, a user could manually actuate a switch to activate the blender if detectors 880 detect emitters 870.

Figure 23:
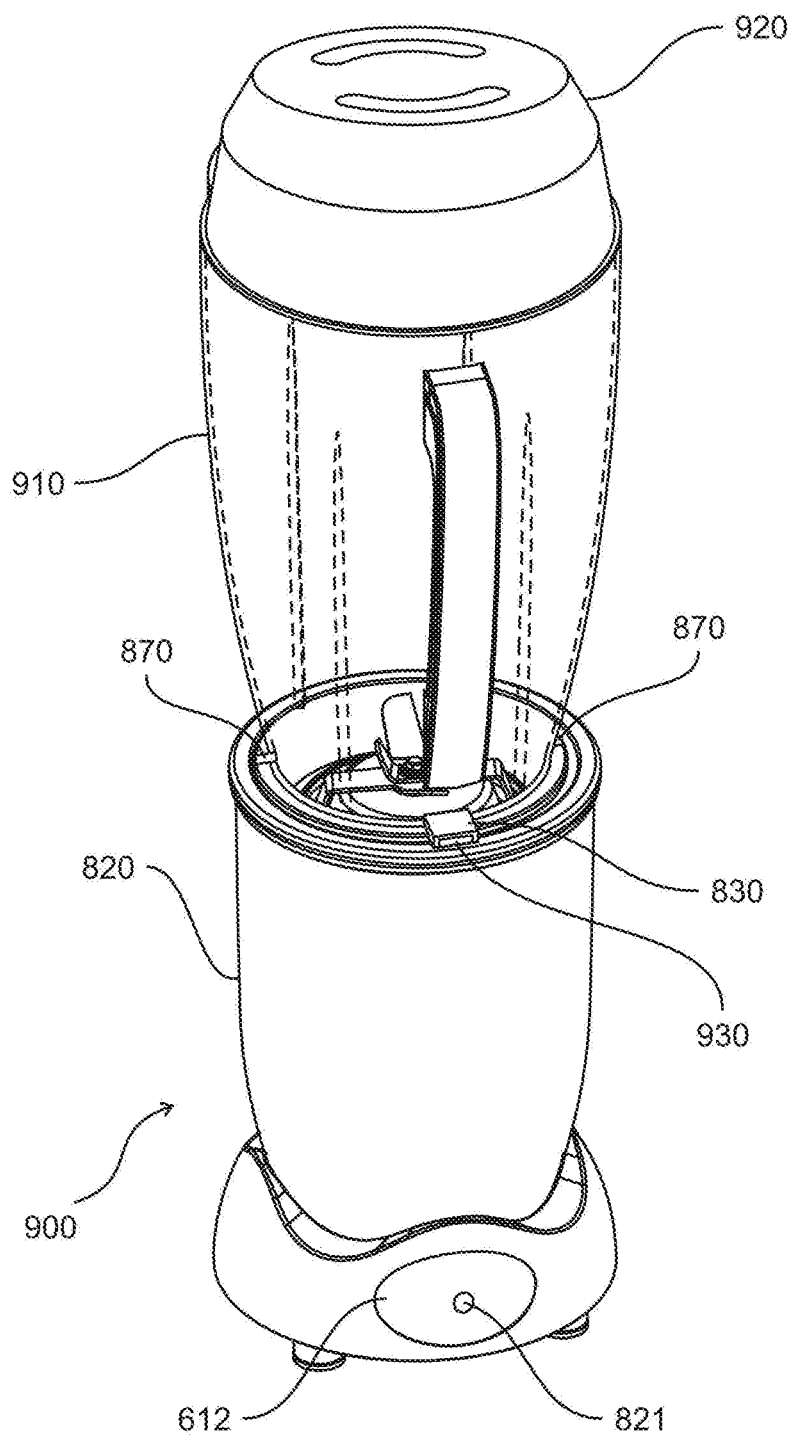
FIG. 23 is a perspective view of a blender in accordance with an embodiment of the present invention with a mixing vessel with two open ends.
Figure 24:
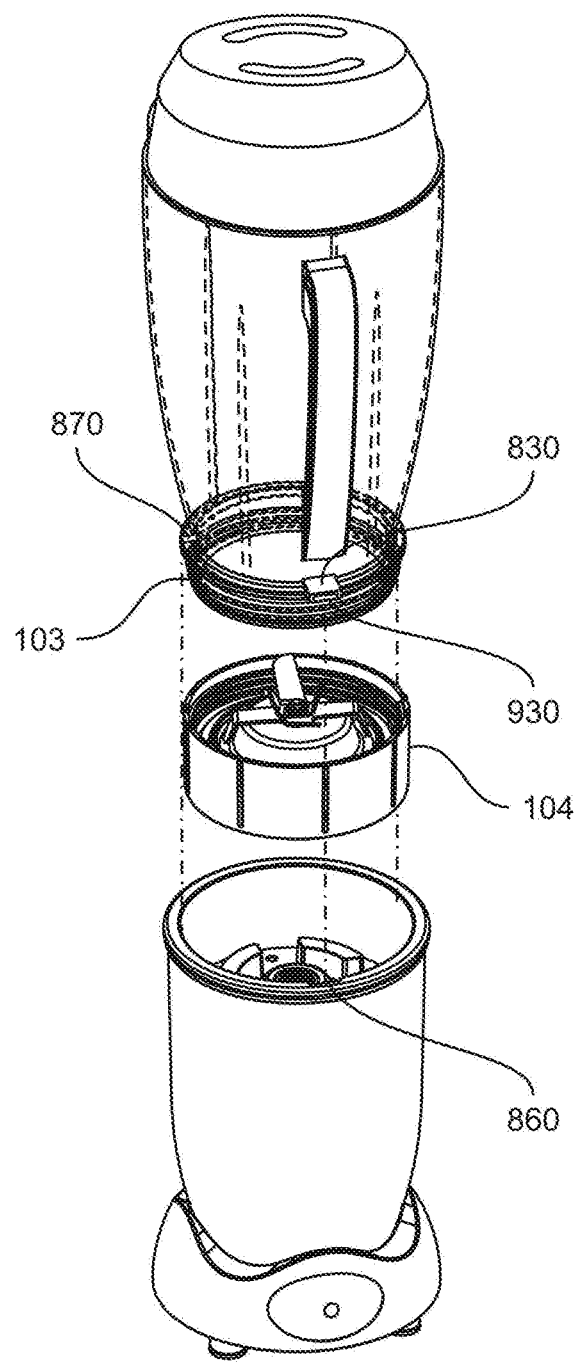
FIG. 24 is perspective view showing the assembly of a mixing vessel with two open ends, blade holder, and base in accordance with an embodiment of the present invention.

FIGS. 23-28 illustrate another embodiment of the present invention comprising a blender 900 that is capable of operating, at varying speeds. In this embodiment, the blender 900 can only operate at certain speeds when it is used with mixing vessel 910. The mixing vessel 910 can be used not only to blend, but also to heat, the food content in the mixing vessel 910. In order to heat the food content in the mixing vessel 801, the blender 900 of this embodiment is capable of operating at a sufficiently high speed that generates heat in order to warm or cook the food content in the mixing vessel 910. Because the food content in the mixing vessel 910 can be heated by the blending operation, it is desirable for the mixing vessel 910 to ventilate the heat. Accordingly, the mixing vessel 910 is open on both of its ends. As shown in FIG. 24, the mixing vessel 910 is removably attachable to the blade holder 104 on one end and removably attachable to a lid 920 on the other open end. When food is being blended and processed by the blender 900, the removable lid 920 can be opened to ventilate the heat in the mixing vessel 910.

As shown in FIGS. 25 and 26, the mixing vessel 910 has a lip 840 (lip 840 is also illustrated in FIGS. 19 and 20). The lip 840 has a circumference that substantially matches the outer circumference of the blade holder 104, such that when the blade holder 104 is affixed to the motor base 820, the lip 840 is substantially flush with the inner surface of well 600 and the top edge of the well wall 851 as shown in FIG. 23. In this preferred embodiment, the lip 840 has at least one emitter 870 on the mixing vessel 910. In a preferred embodiment of the invention as illustrated in FIGS. 25 and 26, the lip 840 has two embedded emitters 870, although one skilled in the art can position the emitters on other positions on mixing vessel 910 besides lip 840 and utilize different numbers of emitters 870.

Figure 31:
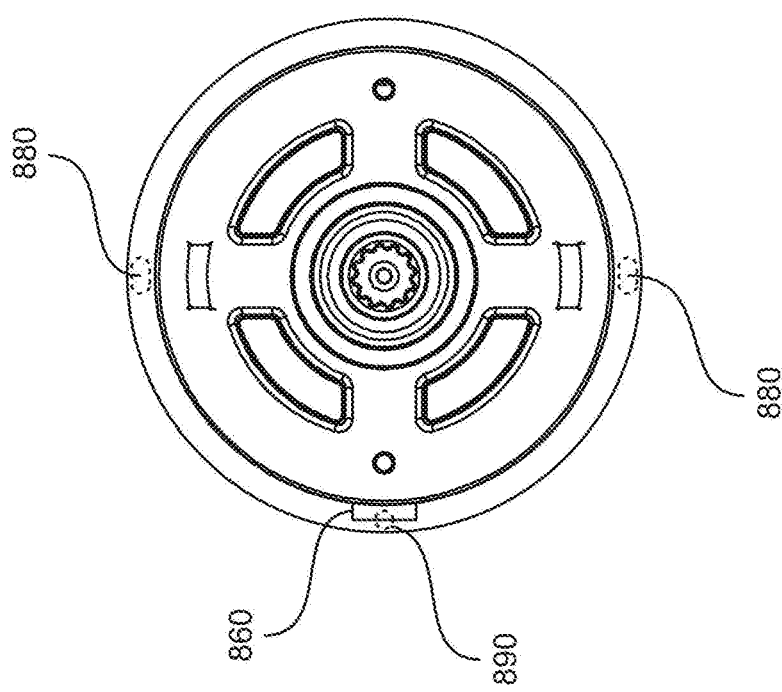
FIG. 31 is a top view of a base of a blender in accordance with an embodiment of the present invention.

The motor base 820 has at least one detector 880 corresponding to at least one emitter 870 on the mixing vessel 910. In a preferred embodiment of the invention as illustrated in FIG. 31, two detectors 880 are embedded under the top edge 851 of the well wall 850. Those skilled in the art can appreciate that detectors 880 may be placed in different positions so long as detectors 880 correspond with the same position as emitters 870.

In this preferred embodiment, when the mixing vessel 910, with the attached blade holder 104, is placed into the well 600 of the motor base 820, the emitters 870 on the lip 840 of the mixing vessel 910 interact with the detectors 880 embedded in the well wall 850 to automatically activate the blender 900.

In the preferred embodiment as shown in FIGS. 25-28, the mixing vessel 910 has a protrusion 830. One skilled in the art may utilize more than one protrusion 830 to better secure mixing vessel 910 to motor base 820. In this preferred embodiment, the protrusion 830 has at least one emitter 930 embedded in it, although one skilled in the art may position the emitter 930 in another position on mixing vessel 910. In this preferred embodiment, the emitter 930 can be a magnet or any signal-emitting component that does not require any physical interaction between the emitter and detector. In an alternative embodiment of the invention, a user could manually actuate a switch to activate the blender if detectors 880 detect emitters 870.

As shown in FIG. 24, the rectangular protrusion 830 is complementary to the rectangular recess 860 (best shown in FIGS. 29 and 31) in the top edge of the well wall 851 of motor base 820. If more than one protrusion 830 is present in other embodiments, those embodiments will also have more than one recess 860. In this embodiment, the motor base 820 has a detector 890 embedded underneath the recess 860, as illustrated in FIGS. 29 and 31, which correspond with the emitter 930 embedded in protrusion 830 of the mixing vessel 910. Other embodiments may also include multiple types of detectors 890 under recess 860. One skilled in the art may also position detector 890 in another position on motor base 820 besides recess 860, so long as it corresponds to the position of emitter 930.

In this preferred embodiment, when the mixing vessel 910, with the attached blade holder 104, is placed into the well 600 of the motor base 820, the protrusion 830 functions to secure the mixing vessel 910 in the operating position by engaging the rectangular recess 860. The protrusion 830 rests within the recess 860 so the mixing vessel 910 does not move when the blender 900 is activated. The protrusion 830 orients the mixing vessel 910 when resting in the recess 860 so that the emitter 930 interacts with the detector 890.

Also in this preferred embodiment the emitter 930 embedded inside the protrusion 830 functions to control the operating speed of the motor base 820. When the emitter 930 interacts with the detector 890, the detector 890 allows the blender 900 to blend at an alternate speed when the user also depresses switch 612. Those skilled in the art will appreciate that more than one type of emitter 930 and detector 890 can be used. Thus, different mixing vessels may have different combinations/numbers of emitters 930 and detectors 890 to allow blender 900 to further differentiate between different types of mixing vessels.

In the preferred embodiment of blender 900, for a user to activate the alternative blend speed, the detector 890 must detect emitter 930 and the user must depress switch 612. In an alternative embodiment, the blender 900 can be operated at the alternative blend speed without requiring the user to depress switch 612. When the alternative blend speed is active, an indicator 821 may indicate to the user that an alternative blend speed is active. The indicator 821 can take the form of an LED that changes color, and those skilled in the art can appreciate that the indicator may be a mechanical indicator that changes position when the user activates switch 612.

Alternative blending speeds can include any speed, known by those skilled in the art that can change the consistency or temperature of the blended contents. For example, the blending speed can be increased dramatically such that the friction from the blades can increase the temperature of the blended contents, resulting in a warm soup as a finished product. Or the blending speed may be slow to facilitate ice cream or sorbet making.

Figure 32:
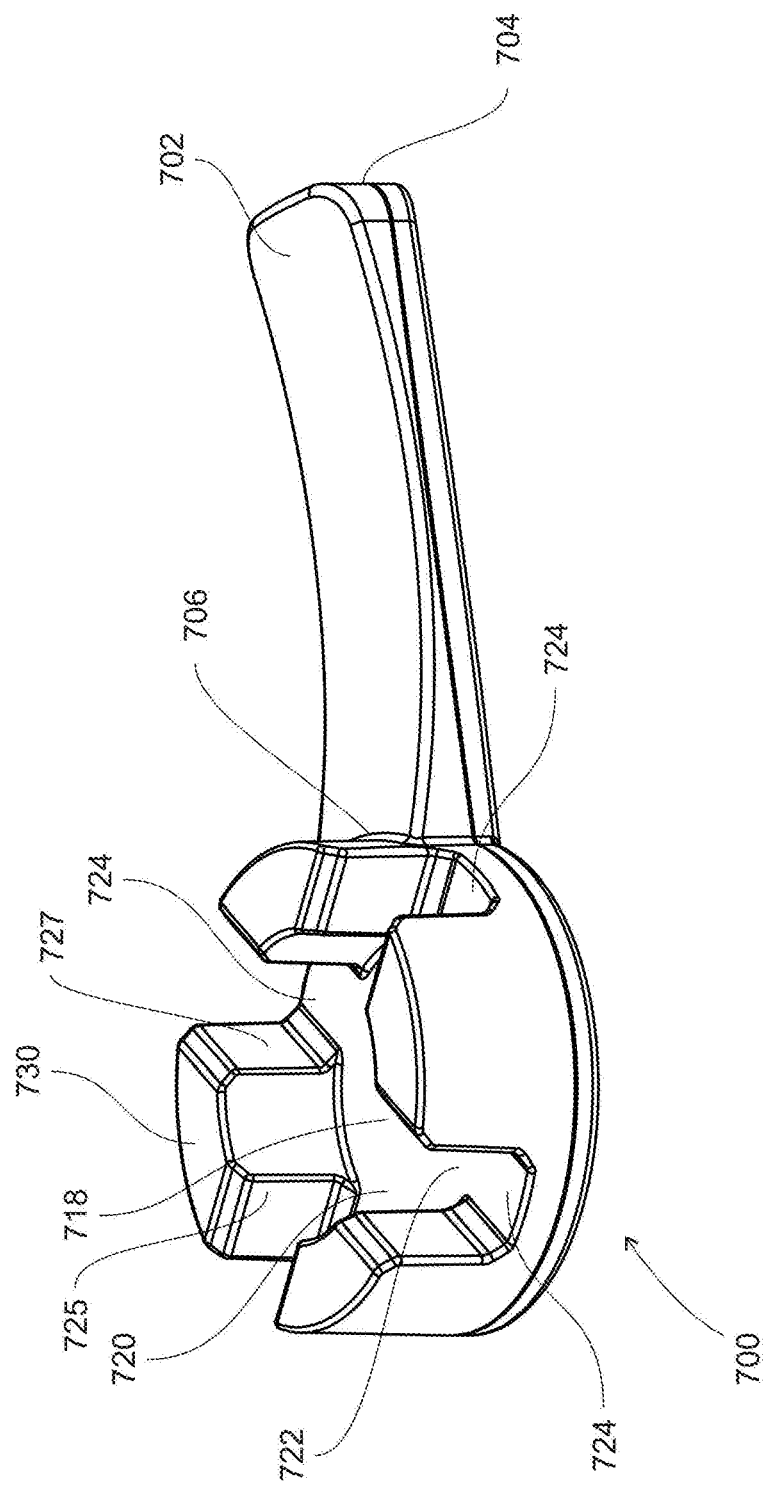
FIG. 32 is a perspective view of a wrench having a recessed socket for unscrewing a mixing vessel from a blade holder in accordance with an embodiment of the present invention.
Figure 33:
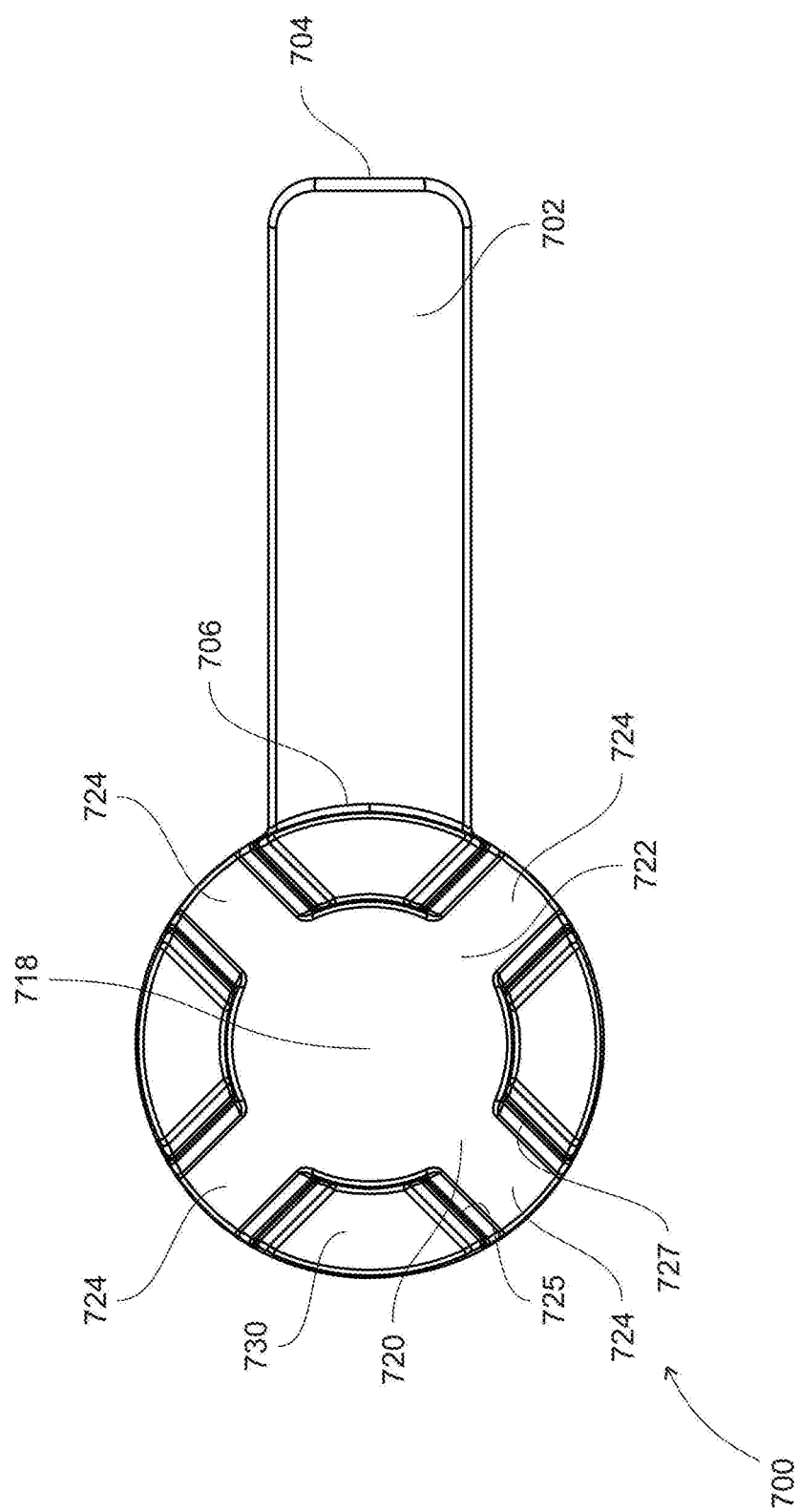
FIG. 33 is a bottom view of a wrench having a recessed socket for unscrewing a mixing vessel from a blade holder in accordance with an embodiment of the present invention.
Figure 34:
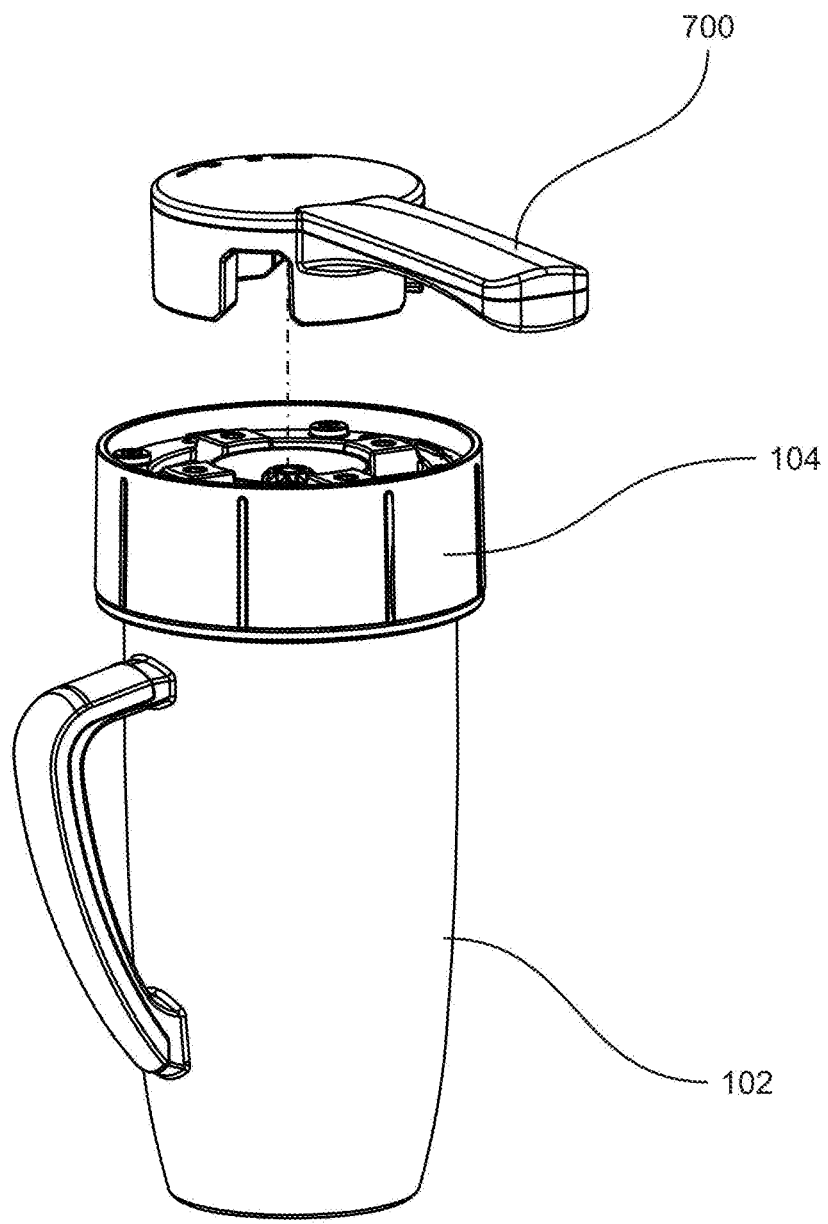
FIG. 34 is a perspective view of a system for opening a mixing vessel, illustrating the mixing vessel, a blade holder and a wrench, in accordance with an embodiment of the present invention.

Now turning FIG. 32, FIG. 33 and FIG. 34, the figures illustrate a wrench 700, a tool for screwing and unscrewing a mixing vessel 102 from a blade holder 104, in accordance with some embodiments of the present invention. The wrench 700 has an elongated member 702 having a first end portion 704 and an opposing second end portion 706. Attached to the second end portion 706 is the head region 718 of the wrench, which has a top surface 730, and bottom surface 720. The bottom surface 720 has a recessed socket 722 that is complimentarily shaped to the bottom surface of the blade holder 104. In the embodiment depicted, the socket 722 has a recessed circular region having an outer periphery 729, and four substantially equidistance grooves 724 that extend from the recessed circular region 722. Each groove 724 has opposing edges 725 and 727 that, when placed over the square shaped raised areas 449 of the blade holder 104, align with a pair of opposing edges on the square shaped raised areas 449, thereby securing the blade holder 104 over the wrench 700, in a horizontal manner. The arch shaped raised areas 726 are also complementary to the recesses 444 at the bottom of the blade holder 104. By securing the blade holder 104 horizontally, when the user holds the mixing vessel 102 with one hand (which is screwed onto the blade holder 104), and the wrench 700 the another hand, and rotates the handle 702 in a counter clockwise horizontal manner, the mixing vessel will loosen from the blade holder 104 due to the added torque that using the handle 702 imparts to the blade holder 104 compared to when the user tries to twist the blade holder 104 off of the mixing vessel 102 directly without the use of the wrench 700. The wrench 700 does not lock the wrench 700 to the blade holder 104 in the vertical direction so that the user can simply and easily place or remove the wrench 700 from the blade holder 104 vertically. The elongated ridges 224 on the external surface of the mixing vessel 102 or a handle 262 on the mixing vessel 102 allows for a an additional grip that leads to improved twisting and untwisting the blade holder 104 on and off of the mixing vessel 102.

The complimentarily shaped wrench 700 with the bottom surface of a blade holder 104 allows the user to tighten the blade holder 104 to the mixing vessel 102 more tightly, especially with combination of the use of the elongated ridges 224 on the outer surface of the mixing vessel 102. Using the wrench 700 to tighten the mixing vessel 102 before the mixing vessel 102 is placed on the motor base 106 prevents spillage of the contents within the mixing vessel 102 to the motor base 106. After the contents of the mixing vessel 102 are mixed, the user removes the mixing vessel 102 and blade holder 104 from the motor and disengages the blade holder 104 from the mixing vessel 102 by gripping with one hand the elongated ridges 224 on the mixing vessel 102, placing the wrench 700 over the bottom surface of the blade holder 104, and applying torque to the blade holder 104 by rotating the handle 702 on the wrench 700 counter clockwise.

The invention has been described in terms of preferred embodiments thereof, but is more broadly applicable as will be understood by those skilled in the art. The scope of the invention is only limited by the scope of the following claims and equivalents thereof.

I claim:

1. A food processing device comprising:
   a plurality of mixing vessels, each of the plurality of mixing vessels having at least one open end;
   a blade holder, having at least one blade and a top rim, said blade adapted to be removably affixed to said at least one open end of a corresponding one of said plurality of mixing vessels;
   a motor base having a motor and a motor base well wall, said motor base adapted to circumferentially surround said blade holder when said blade holder is placed within said motor base well wall;
   at least one emitter on an exterior surface of each of said plurality of mixing vessels, said at least one emitter positioned above said top rim of said blade holder when said blade holder is coupled with said corresponding one of said plurality of mixing vessels; and
   at least one detector embedded in said motor base for detecting a signal from said at least one emitter, said at least one detector capable of being positioned at any circumferential position along a circumference of said motor base well wall to detect said signal,
   wherein said motor base is activated when said corresponding one of said plurality of mixing vessels is engaged to said motor base such that said at least one detector detects said signal.

2. The food processing device of claim 1, wherein:
   each of said plurality of mixing vessels further has a lip located in proximity to one of said at least one open end, said lip extending radially outward from an exterior surface of said mixing vessel; and
   said at least one emitter is embedded in said lip.

3. The food processing device of claim 1, wherein said at least one emitter in each of said plurality of mixing vessels is capable of emitting a signal to said at least one detector to activate an alternative blend speed depending on said signal.

4. The food processing device of claim 1, wherein:
each of said plurality of mixing vessels has a protrusion located in proximity to one of said at least one open end;
said at least one emitter is embedded in said protrusion;
a recess is embedded in said motor base for receiving said protrusion, wherein said at least one detector is embedded in said recess;
wherein said at least one emitter is capable of emitting a signal to said at least one detector to activate an alternative blending speed depending on said signal when said protrusion is engaged with said recess.

5. The food processing device of claim 4, wherein said detector is a reed switch.

6. The food processing device of claim 4, further comprising a switch located on said motor base, said switch connected to an electrical circuit capable of activating said alternative blending speed.

7. The food processing device of claim 6, said switch has an indicator light that changes color depending on said activated alternative blending speed.

8. The food processing device of claim 1, wherein the motor speed is adjusted based on an identification of said one of said plurality of mixing vessels that is attached to said motor base.

9. The food processing device according to claim 1, further comprising a plurality of blade holders, each of said plurality of blade holders corresponding with one of said plurality of mixing vessels.

10. The food processing device of claim 1, wherein said at least one emitter is magnet.

11. The food processing device of claim 1, wherein said at least one detector is a hall sensor.

* * * * *